US008553519B2

(12) United States Patent
Mantri

(10) Patent No.: US 8,553,519 B2
(45) Date of Patent: Oct. 8, 2013

(54) SYSTEM AND METHOD FOR COORDINATION OF NEIGHBORING NETWORKS ON WIRELINE COMMUNICATION CHANNELS

(75) Inventor: Ravi G. Mantri, Portland, OR (US)

(73) Assignee: Matanoia Communications Inc. (TW)

( * ) Notice: Subject to any disclaimer, the term of this patent is extended or adjusted under 35 U.S.C. 154(b) by 331 days.

(21) Appl. No.: 12/903,160

(22) Filed: Oct. 12, 2010

(65) Prior Publication Data
US 2012/0087229 A1 Apr. 12, 2012

(51) Int. Cl.
*H04J 1/12* (2006.01)
(52) U.S. Cl.
USPC .......................................................... 370/201
(58) Field of Classification Search
USPC ................. 370/201, 255, 338, 329, 330, 328; 455/434, 450, 452, 552
See application file for complete search history.

(56) References Cited

U.S. PATENT DOCUMENTS

| | | | | |
|---|---|---|---|---|
| 5,844,894 A * | 12/1998 | Dent | | 370/330 |
| 2008/0019329 A1* | 1/2008 | Benveniste | | 370/337 |
| 2009/0054073 A1* | 2/2009 | Roy et al. | | 455/450 |
| 2009/0082027 A1* | 3/2009 | Yavuz et al. | | 455/446 |
| 2011/0292848 A1* | 12/2011 | Roy et al. | | 370/280 |

* cited by examiner

*Primary Examiner* — Chi Pham
*Assistant Examiner* — Fahmida Chowdhury
(74) *Attorney, Agent, or Firm* — Han IP Corporation; Andy M. Han

(57) ABSTRACT

Embodiments of system and method for coordination among neighboring networks for communications over shared physical medium are provided. In one aspect, a method comprises determining, by a first domain master of a first network domain, a first number of network nodes of the first network domain that interfere with data transmission on the physical medium by at least one network node of at least one other network domain, or a second number of network nodes of the at least one other network domain that interfere with data transmission on the physical medium by at least one network node of the first network domain. The method further comprises causing, by the first domain master, one or more network nodes of the first network domain to transmit data during one of a plurality of non-overlapping time slots of a MAC cycle.

36 Claims, 16 Drawing Sheets

900

902

DETERMINE, BY A FIRST DOMAIN MASTER OF A FIRST NETWORK DOMAIN, A FIRST NUMBER OF NETWORK NODES OF THE FIRST NETWORK DOMAIN THAT INTERFERE WITH DATA TRANSMISSION ON THE PHYSICAL MEDIUM BY AT LEAST ONE NETWORK NODE OF AT LEAST ONE OTHER NETWORK DOMAIN, OR A SECOND NUMBER OF NETWORK NODES OF THE AT LEAST ONE OTHER NETWORK DOMAIN THAT INTERFERE WITH DATA TRANSMISSION ON THE PHYSICAL MEDIUM BY AT LEAST ONE NETWORK NODE OF THE FIRST NETWORK DOMAIN

904

CAUSE, BY THE FIRST DOMAIN MASTER, ONE OR MORE NETWORK NODES OF THE FIRST NETWORK DOMAIN TO TRANSMIT DATA DURING ONE OF A PLURALITY OF NON-OVERLAPPING TIME SLOTS OF A MEDIA ACCESS CONTROL (MAC) CYCLE, EACH OF THE PLURALITY OF NON-OVERLAPPING TIME SLOTS ALLOCATED TO A RESPECTIVE ONE OF THE FIRST AND THE AT LEAST ONE OTHER NETWORK DOMAINS

DETERMINE, BY A FIRST DOMAIN MASTER OF A FIRST NETWORK DOMAIN, A FIRST NUMBER OF NETWORK NODES OF THE FIRST NETWORK DOMAIN THAT INTERFERE WITH DATA TRANSMISSION ON THE PHYSICAL MEDIUM BY AT LEAST ONE NETWORK NODE OF AT LEAST ONE OTHER NETWORK DOMAIN, OR A SECOND NUMBER OF NETWORK NODES OF THE AT LEAST ONE OTHER NETWORK DOMAIN THAT INTERFERE WITH DATA TRANSMISSION ON THE PHYSICAL MEDIUM BY AT LEAST ONE NETWORK NODE OF THE FIRST NETWORK DOMAIN

904

CAUSE, BY THE FIRST DOMAIN MASTER, ONE OR MORE NETWORK NODES OF THE FIRST NETWORK DOMAIN TO TRANSMIT DATA DURING ONE OF A PLURALITY OF NON-OVERLAPPING TIME SLOTS OF A MEDIA ACCESS CONTROL (MAC) CYCLE, EACH OF THE PLURALITY OF NON-OVERLAPPING TIME SLOTS ALLOCATED TO A RESPECTIVE ONE OF THE FIRST AND THE AT LEAST ONE OTHER NETWORK DOMAINS

1006

SCRAMBLE A REVERSED MAC ADDRESS OF THE FIRST DOMAIN MASTER AND A RESPECTIVE REVERSED MAC ADDRESS OF A RESPECTIVE DOMAIN MASTER OF EACH OF THE AT LEAST ONE OTHER NETWORK DOMAIN TO DETERMINE AN ORDER IN WHICH THE TIME SLOTS ARE ALLOCATED TO THE DOMAIN MASTERS OF THE FIRST AND THE AT LEAST ONE OTHER NETWORK DOMAINS

1008

ALLOCATE THE TIME SLOTS TO THE DOMAIN MASTERS OF THE FIRST AND THE AT LEAST ONE OTHER NETWORK DOMAINS ACCORDING TO THE DETERMINED ORDER

902
DETERMINE, BY A FIRST DOMAIN MASTER OF A FIRST NETWORK DOMAIN, A FIRST NUMBER OF NETWORK NODES OF THE FIRST NETWORK DOMAIN THAT INTERFERE WITH DATA TRANSMISSION ON THE PHYSICAL MEDIUM BY AT LEAST ONE NETWORK NODE OF AT LEAST ONE OTHER NETWORK DOMAIN, OR A SECOND NUMBER OF NETWORK NODES OF THE AT LEAST ONE OTHER NETWORK DOMAIN THAT INTERFERE WITH DATA TRANSMISSION ON THE PHYSICAL MEDIUM BY AT LEAST ONE NETWORK NODE OF THE FIRST NETWORK DOMAIN

904
CAUSE, BY THE FIRST DOMAIN MASTER, ONE OR MORE NETWORK NODES OF THE FIRST NETWORK DOMAIN TO TRANSMIT DATA DURING ONE OF A PLURALITY OF NON-OVERLAPPING TIME SLOTS OF A MEDIA ACCESS CONTROL (MAC) CYCLE, EACH OF THE PLURALITY OF NON-OVERLAPPING TIME SLOTS ALLOCATED TO A RESPECTIVE ONE OF THE FIRST AND THE AT LEAST ONE OTHER NETWORK DOMAINS

1106
GENERATE A PSEUDO-RANDOM ORDER BASED AT LEAST IN PART ON A RESPECTIVE DEVICE IDENTIFIER OR A RESPECTIVE MAC ADDRESS OF EACH OF THE DOMAIN MASTERS OF THE FIRST AND THE AT LEAST ONE OTHER NETWORK DOMAINS

1108
ALLOCATE THE TIME SLOTS TO THE DOMAIN MASTERS OF THE FIRST AND THE AT LEAST ONE OTHER NETWORK DOMAINS ACCORDING TO THE PSEUDO-RANDOM ORDER

DETERMINE, BY A FIRST DOMAIN MASTER OF A FIRST NETWORK DOMAIN, A FIRST NUMBER OF NETWORK NODES OF THE FIRST NETWORK DOMAIN THAT INTERFERE WITH DATA TRANSMISSION ON THE PHYSICAL MEDIUM BY AT LEAST ONE NETWORK NODE OF AT LEAST ONE OTHER NETWORK DOMAIN, OR A SECOND NUMBER OF NETWORK NODES OF THE AT LEAST ONE OTHER NETWORK DOMAIN THAT INTERFERE WITH DATA TRANSMISSION ON THE PHYSICAL MEDIUM BY AT LEAST ONE NETWORK NODE OF THE FIRST NETWORK DOMAIN

904

CAUSE, BY THE FIRST DOMAIN MASTER, ONE OR MORE NETWORK NODES OF THE FIRST NETWORK DOMAIN TO TRANSMIT DATA DURING ONE OF A PLURALITY OF NON-OVERLAPPING TIME SLOTS OF A MEDIA ACCESS CONTROL (MAC) CYCLE, EACH OF THE PLURALITY OF NON-OVERLAPPING TIME SLOTS ALLOCATED TO A RESPECTIVE ONE OF THE FIRST AND THE AT LEAST ONE OTHER NETWORK DOMAINS

1206

PLACE IN SLEEP MODE ONE OR MORE NODES IN THE FIRST NETWORK DOMAIN THAT MAY SUFFER INTERFERENCE FROM TRANSMISSION BY AT LEAST ONE NODE IN ONE OF THE AT LEAST ONE OTHER NETWORK DOMAIN DURING A PORTION OF THE MAC CYCLE ALLOCATED TO THE ONE OF THE AT LEAST ONE OTHER NETWORK DOMAIN

902
DETERMINE, BY A FIRST DOMAIN MASTER OF A FIRST NETWORK DOMAIN, A FIRST NUMBER OF NETWORK NODES OF THE FIRST NETWORK DOMAIN THAT INTERFERE WITH DATA TRANSMISSION ON THE PHYSICAL MEDIUM BY AT LEAST ONE NETWORK NODE OF AT LEAST ONE OTHER NETWORK DOMAIN, OR A SECOND NUMBER OF NETWORK NODES OF THE AT LEAST ONE OTHER NETWORK DOMAIN THAT INTERFERE WITH DATA TRANSMISSION ON THE PHYSICAL MEDIUM BY AT LEAST ONE NETWORK NODE OF THE FIRST NETWORK DOMAIN

904
CAUSE, BY THE FIRST DOMAIN MASTER, ONE OR MORE NETWORK NODES OF THE FIRST NETWORK DOMAIN TO TRANSMIT DATA DURING ONE OF A PLURALITY OF NON-OVERLAPPING TIME SLOTS OF A MEDIA ACCESS CONTROL (MAC) CYCLE, EACH OF THE PLURALITY OF NON-OVERLAPPING TIME SLOTS ALLOCATED TO A RESPECTIVE ONE OF THE FIRST AND THE AT LEAST ONE OTHER NETWORK DOMAINS

1406
GENERATE, BY THE FIRST DOMAIN MASTER, A COORDINATION TABLE INDICATING ONE OR MORE RESPECTIVE NETWORK NODES IN EACH OF THE FIRST AND THE AT LEAST ONE OTHER NETWORK DOMAINS THAT INTERFERE WITH AT LEAST ONE NETWORK NODE OF ANOTHER NETWORK DOMAIN AND THE RESPECTIVE NETWORK DOMAIN HAVING THE INTERFERED AT LEAST ONE NETWORK NODE

1408
PROVIDE, BY THE FIRST DOMAIN MASTER, THE COORDINATION TABLE TO A RESPECTIVE DOMAIN MASTER OF EACH OF THE AT LEAST ONE OTHER NETWORK DOMAIN

902
DETERMINE, BY A FIRST DOMAIN MASTER OF A FIRST NETWORK DOMAIN, A FIRST NUMBER OF NETWORK NODES OF THE FIRST NETWORK DOMAIN THAT INTERFERE WITH DATA TRANSMISSION ON THE PHYSICAL MEDIUM BY AT LEAST ONE NETWORK NODE OF AT LEAST ONE OTHER NETWORK DOMAIN, OR A SECOND NUMBER OF NETWORK NODES OF THE AT LEAST ONE OTHER NETWORK DOMAIN THAT INTERFERE WITH DATA TRANSMISSION ON THE PHYSICAL MEDIUM BY AT LEAST ONE NETWORK NODE OF THE FIRST NETWORK DOMAIN

904
CAUSE, BY THE FIRST DOMAIN MASTER, ONE OR MORE NETWORK NODES OF THE FIRST NETWORK DOMAIN TO TRANSMIT DATA DURING ONE OF A PLURALITY OF NON-OVERLAPPING TIME SLOTS OF A MEDIA ACCESS CONTROL (MAC) CYCLE, EACH OF THE PLURALITY OF NON-OVERLAPPING TIME SLOTS ALLOCATED TO A RESPECTIVE ONE OF THE FIRST AND THE AT LEAST ONE OTHER NETWORK DOMAINS

1506
PROVIDE, BY THE FIRST DOMAIN MASTER, A COORDINATION TABLE TO A SYSTEM OPERATOR, THE COORDINATION TABLE INDICATING ONE OR MORE RESPECTIVE NETWORK NODES IN EACH OF THE FIRST AND THE AT LEAST ONE OTHER NETWORK DOMAINS THAT INTERFERE WITH AT LEAST ONE NETWORK NODE OF ANOTHER NETWORK DOMAIN AND THE RESPECTIVE NETWORK DOMAIN HAVING THE INTERFERED AT LEAST ONE NETWORK NODE

1508
RECEIVE, BY THE FIRST DOMAIN MASTER, FROM THE SYSTEM OPERATOR A FINAL COORDINATION TABLE THAT INCORPORATES INFORMATION IN THE COORDINATION TABLE PROVIDED BY THE FIRST DOMAIN MASTER AND INFORMATION IN A RESPECTIVE COORDINATION TABLE PROVIDED BY A RESPECTIVE DOMAIN MASTER OF EACH OF THE AT LEAST ONE OTHER NETWORK DOMAIN

DETERMINE, BY A FIRST DOMAIN MASTER OF A FIRST NETWORK DOMAIN, A FIRST NUMBER OF NETWORK NODES OF THE FIRST NETWORK DOMAIN THAT INTERFERE WITH DATA TRANSMISSION ON THE PHYSICAL MEDIUM BY AT LEAST ONE NETWORK NODE OF AT LEAST ONE OTHER NETWORK DOMAIN, OR A SECOND NUMBER OF NETWORK NODES OF THE AT LEAST ONE OTHER NETWORK DOMAIN THAT INTERFERE WITH DATA TRANSMISSION ON THE PHYSICAL MEDIUM BY AT LEAST ONE NETWORK NODE OF THE FIRST NETWORK DOMAIN

904

CAUSE, BY THE FIRST DOMAIN MASTER, ONE OR MORE NETWORK NODES OF THE FIRST NETWORK DOMAIN TO TRANSMIT DATA DURING ONE OF A PLURALITY OF NON-OVERLAPPING TIME SLOTS OF A MEDIA ACCESS CONTROL (MAC) CYCLE, EACH OF THE PLURALITY OF NON-OVERLAPPING TIME SLOTS ALLOCATED TO A RESPECTIVE ONE OF THE FIRST AND THE AT LEAST ONE OTHER NETWORK DOMAINS

1606

ALLOCATE A QUANTITY OF N NON-OVERLAPPING TIME SLOTS OF EQUAL DURATION TO M NETWORK DOMAINS, M BEING A QUANTITY OF A NUMBER OF MUTUALLY-INTERFERING NETWORK DOMAINS, EACH OF THE M NETWORK DOMAINS ALLOCATED WITH ONE OF THE TIME SLOTS WITH A QUANTITY OF (N-M) TIME SLOTS UNALLOCATED WHEN N > M

1608

REPEATEDLY ALLOCATE THE UNALLOCATED TIME SLOTS TO THE M NETWORK DOMAINS K TIMES WITH L TIME SLOTS REMAINING UNALLOCATED WHEN K > 0, WHERE K = (N-M)/M

1610

EQUALLY DIVIDE EACH OF THE L UNALLOCATED TIME SLOTS AND ALLOCATING THE EQUALLY DIVIDED TIME SLOTS TO THE M NETWORK DOMAINS

FIGURE 16

SYSTEM AND METHOD FOR COORDINATION OF NEIGHBORING NETWORKS ON WIRELINE COMMUNICATION CHANNELS

BACKGROUND

1. Technical Field

The present disclosure pertains to networking technology. More particularly, the present disclosure pertains to coordination among neighboring networks for communications over shared physical medium.

2. Description of Related Art

There is generally a growing demand from individual customers and enterprise customers for a high-throughput, cost-effective network that provides reliable services. Service providers, such as telephone companies and cable companies, are frequently upgrading their networks to provide such networks to attempt to provide reliable services over their networks. Typically, network access provided to customer premises by service providers in the case of single-family homes and multi-dwelling units (MDUs) tends to be through means like fiber, DSL or co-axial cable. After providing the network access, service providers still need to ensure the delivery of services at different points inside the customer premises. Some of those points, such as TV and computer for Internet access, usually demand services requiring high data rate. Besides, in a typical household, there are usually multiple ports that need to be supported in the home network. Accordingly, a typical home or apartment units in an MDU may need to share the same physical medium to operate the different network nodes of the home network. In some cases there may be physical isolation between neighboring networks, but in most cases at least a subset of network nodes in any network may suffer from interference from one or more network nodes in one or more neighboring networks.

The standards dealing with wireline network communications specify the behavior of different network nodes of a network established over communication channels such as power line, coaxial cable, phone line and Ethernet. Regardless of the type of physical medium, each network generally has a central coordinator, also known as a domain master (DM). If multiple networks are established over the same physical medium without some kind of coordination amongst the DMs of the multiple networks, interference between these networks may occur and quality of service may suffer as a result.

There is, therefore, a need for a scheme to coordinate among the DMs of neighboring networks to minimize mutual interference between the neighboring networks and to maximize throughput.

SUMMARY

Disclosed is a scheme that enables the coordination among neighboring networks so that mutual interference between the network nodes of these neighboring networks is minimized and the channel resources are shared efficiently and equitably between competing networks. The proposed scheme is applicable to all standards which specify DM-managed networks, such as ITU-T G.9960/G.9961 (g.hn), IEEE P1901/Homeplug, ITU-T g.hnem, IEEE P1901.2 and other related standards for coaxial cable like Moca.

In one aspect, a method of coordination of physical medium access among neighboring domains of network nodes is provided. The method may comprise: determining, by a first domain master of a first network domain, a first number of network nodes of the first network domain that interfere with data transmission on the physical medium by at least one network node of at least one other network domain, or a second number of network nodes of the at least one other network domain that interfere with data transmission on the physical medium by at least one network node of the first network domain; and causing, by the first domain master, one or more network nodes of the first network domain to transmit data during one of a plurality of non-overlapping time slots of a Media Access Control (MAC) cycle, each of the plurality of non-overlapping time slots allocated to a respective one of the first and the at least one other network domains.

The first domain master may further perform acts comprising: determining the second number of network nodes of the at least one other network domain that interfere with data transmission on the physical medium by at least one network node of the first network domain; communicating information relating to the second number of network nodes to a respective domain master of each of the at least one other network domain; receiving information relating to the first number of network nodes from the respective domain master of each of the at least one other network domain; and dividing the MAC cycle into the plurality of non-overlapping time slots such that each of the plurality of non-overlapping time slots is allocated for transmission by one or more nodes of a respective one of the first and the at least one other network domains.

The first domain master may divide the MAC cycle into the plurality of non-overlapping time slots in equal proportion among the first and the at least one other network domains. Alternatively, the first domain master may divide the MAC cycle into the plurality of non-overlapping time slots according to a setting by a service provider.

The method may further comprise: scrambling a reversed MAC address of the first domain master and a respective reversed MAC address of a respective domain master of each of the at least one other network domain to determine an order in which the time slots are allocated to the domain masters of the first and the at least one other network domains; and allocating the time slots to the domain masters of the first and the at least one other network domains according to the determined order.

Additionally or alternatively, the method may further comprise: generating a pseudo-random order based at least in part on a respective device identifier or a respective MAC address of each of the domain masters of the first and the at least one other network domains; and allocating the time slots to the domain masters of the first and the at least one other network domains according to the pseudo-random order.

Additionally or alternatively, the method may further comprise: placing in sleep mode one or more nodes in the first network domain that may suffer interference from transmission by at least one node in one of the at least one other network domain during a portion of the MAC cycle allocated to the one of the at least one other network domain.

Additionally or alternatively, the method may further comprise: leasing, by the first domain master, from a second domain master of one of the at least one other network domain a time slot allocated to the one of the at least one other network domain to allow one or more nodes of the first network domain to transmit data on the physical medium during the leased time slot.

The first domain master and the second domain master may negotiate the leasing of the time slot by the first domain master offering a number of credits to the second domain master and the second domain master determining whether to accept the offered credits from the first domain master, a goal of each of the first and second domain masters being to maximize a respective number of credits collected. The number of credits offered by the first domain master to the second domain master may depend proportionately on a priority based on the first network domain's traffic or urgency for additional access to the physical medium. The priority may be user-configured, and a respective initial number of credits of each of the first domain master and the second domain master may be configured by a system operator. Alternatively or additionally, the exchange of credits happens through the system operator which acts as an intermediary for the transactions between two DMs exchanging credits and also keeps track of the credit balance of the negotiating DMs.

Additionally or alternatively, the method may implement one or more of following leasing policies: (1) the first domain master leasing a time slot allocated to the first network domain but not used by the first network domain to a second domain master of a second network domain of the at least one other network domain when requested by the second domain master; (2) the first domain master negotiating with the second domain master to lease the unused time slot when the first domain master accepts a number of credits offered by the second domain master which may alternatively or additionally be done through the system operator acting as an intermediary that keeps track of the credits and facilitates the exchange of the credits; (3) the first domain master leasing to the second domain master part or all of the unused time slot to be used in a Carrier Sensing Multiple Access (CSMA) transmit opportunity when the leasing allows the first and second network domains to use the leased time slot by following a back-off procedure which may alternatively or additionally based on the second domain master reciprocating; and (4) the first domain master leasing to the second domain master part or all of the unused time slot to be used in an Orthogonal Carrier Sensing Multiple Access (OCSMA) transmit opportunity where transmitting nodes in either network domain are allowed to transmit only using preambles that are designed to be orthogonal to the preambles from interfering nodes in coordinating network domain, when the leasing allows the first and second network domains to use the leased time slot by following a back-off procedure.

Alternatively or additionally, the leasing may be based on the second DM reciprocating the offer from the first DM. The orthogonal preambles allow nodes from a network domain to tune their detectors to the preamble expected from transmission within their network domain and ignore transmissions from neighboring network domains. This scheme works better when the interference between the nodes from neighboring network domains is low, allowing reuse of the same transmit opportunity in both network domains.

The method may further comprise: generating, by the first domain master, a coordination table indicating one or more respective network nodes in each of the first and the at least one other network domains that interfere with at least one network node of another network domain and the respective network domain having the interfered at least one network node; and providing, by the first domain master, the coordination table to a respective domain master of each of the at least one other network domain. Additionally, the method may further comprise: communicating, by the first domain master, to the respective domain master of each of the at least one other network domain a proposed value of a synchronous counter when an allocation of the non-overlapping time slots needs to be updated; receiving, by the first domain master, an acknowledgment from a second domain master of a second network domain of the at least one other network domain when the second domain master accepts the proposed value; and providing, by the first domain master, to the respective domain master of each of the at least one other network domain a binding proposal after the first domain master has received acknowledgment from the respective domain master of each of the at least one other network domain.

The method may further comprise: providing, by the first domain master, a coordination table to a system operator, the coordination table indicating one or more respective network nodes in each of the first and the at least one other network domains that interfere with at least one network node of another network domain and the respective network domain having the interfered at least one network node; and receiving, by the first domain master, from the system operator a final coordination table that incorporates information in the coordination table provided by the first domain master and information in a respective coordination table provided by a respective domain master of each of the at least one other network domain.

The method may further comprise: allocating a quantity of N non-overlapping time slots of equal duration to m network domains, m being a quantity of a number of mutually-interfering network domains, each of the m network domains allocated with one of the time slots with a quantity of (N−m) time slots unallocated when N>m; repeatedly allocating the unallocated time slots to the m network domains K times with L time slots remaining unallocated when K>0, where K=(N−m)/m; and equally dividing each of the L unallocated time slots and allocating the equally divided time slots to the m network domains.

In another aspect, a device that, when implemented in a first domain master apparatus of a first network domain including a plurality of network nodes, causes the first domain master apparatus to coordinate with domain master apparatuses of neighboring network domains is provided. The device may cause the first domain master apparatus to perform acts comprising: determining a first number of network nodes of the first network domain that interfere with data transmission on a physical medium by at least one network node of at least one other network domain, or a second number of network nodes of the at least one other network domain that interfere with data transmission on the physical medium by at least one network node of the first network domain; and causing one or more network nodes of the first network domain to transmit data during one of a plurality of non-overlapping time slots of a MAC cycle, each of the plurality of non-overlapping time slots allocated to a respective one of the first and the at least one other network domains.

The device may further cause the first domain master apparatus to perform acts comprising: determining the second number of network nodes of the at least one other network domain that interfere with data transmission on the physical medium by at least one network node of the first network domain; communicating information relating to the second number of network nodes to a respective domain master apparatus of each of the at least one other network domain; receiving information relating to the first number of network nodes from the respective domain master apparatus of each of the one other network domain; and dividing the MAC cycle into the plurality of non-overlapping time slots such that each of the plurality of non-overlapping time slots is allocated for transmission by one or more nodes of a respective one of the first and the at least one other network domains. The device may cause the first domain master apparatus to divide the MAC cycle into the plurality of non-overlapping time slots in equal proportion among the first and the at least one other network domains. Alternatively, the device may cause the first domain master apparatus to divide the MAC cycle into the plurality of non-overlapping time slots according to a setting by the system operator.

Additionally or alternatively, the device may further cause the first domain master apparatus to perform acts comprising: scrambling a reversed MAC address of the first domain master apparatus and a respective reversed MAC address of a respective domain master apparatus of each of the at least one other network domain to determine an order in which the time slots are allocated to the domain master apparatuses of the first and the at least one other network domains; and allocating the time slots to the domain master apparatuses of the first and the at least one other network domains according to the determined order.

Additionally or alternatively, the device may further cause the first domain master apparatus to perform acts comprising: generating a pseudo-random order based at least in part on a respective device identifier or a respective MAC address of each of the domain master apparatuses of the first and the at least one other network domains; and allocating the time slots to the domain master apparatuses of the first and the at least one other network domains according to the pseudo-random order.

Additionally or alternatively, the device may further cause the first domain master apparatus to perform acts comprising: placing in sleep mode one or more nodes in the first network domain that may suffer interference from transmission by at least one node in one of the at least one other network domain during a portion of the MAC cycle allocated to the one of the at least one other network domain.

The device may comprise an integrated circuit, and the physical medium may comprise a power line, a coaxial cable, a phone line, an Ethernet, or a combination thereof.

Additionally or alternatively, the device may cause the first domain master apparatus to communicate with other domain master apparatuses prior to coordination via Registration Contention Based Time Slot (RCBTS).

This summary is provided to introduce techniques relating to coordination among neighboring networks for communications over shared physical medium such as power line, coaxial cable, phone line and Ethernet. These techniques are further described below in the detailed description. This summary is not intended to identify essential features of the claimed subject matter, nor is it intended for use in determining the scope of the claimed subject matter.

BRIEF DESCRIPTION OF THE DRAWINGS

The present disclosure is described with reference to the accompanying figures. In the figures, the left-most digit(s) of a reference number identifies the figure in which the reference number first appears. The same reference numbers in different figures indicate similar or identical items.

FIG. 9 is a flow diagram illustrating an exemplary method implementing the coordination scheme in accordance with the present disclosure.

FIG. 10 is a flow diagram illustrating another exemplary method implementing the coordination scheme in accordance with the present disclosure.

FIG. 11 is a flow diagram illustrating another exemplary method implementing the coordination scheme in accordance with the present disclosure.

FIG. 12 is a flow diagram illustrating another exemplary method implementing the coordination scheme in accordance with the present disclosure.

FIG. 14 is a flow diagram illustrating another exemplary method implementing the coordination scheme in accordance with the present disclosure.

FIG. 15 is a flow diagram illustrating another exemplary method implementing the coordination scheme in accordance with the present disclosure.

FIG. 16 is a flow diagram illustrating another exemplary method implementing the coordination scheme in accordance with the present disclosure.

DETAILED DESCRIPTION

Overview

The present disclosure describes techniques for coordination among neighboring networks for communications over shared physical medium.

It is to be noted that there is a distinction between lower interference, which is seen as additional noise and does not require coordination or may be handled using orthogonal preambles, and higher interference, which requires some kind of coordination for efficient use of the physical medium. Throughout the rest of this document, the term "interference" refers to higher interference that requires some kind of coordination, unless the term "low interference" or "lower interference" is specifically used.

In general, as a communication system with a DM operates according to a schedule generated and communicated by the DM, it is conceivable that the DMs from neighboring networks can coordinate their respective schedules to minimize destructive mutual interference and maximize the throughput supported by the neighboring networks.

The proposed scheme is loosely based on the resolution of "the tragedy of the commons," which is a situation in which multiple entities, acting independently and rationally according to their own self-interest, will ultimately deplete a shared limited resource. Typical solution to problems that involve sharing of limited resources is to convert common resources into private property, giving the new owner an incentive to enforce its sustainability.

The proposed scheme is applicable to all standards which specify DM managed networks (centrally coordinated networks), such as ITU-T G.9960/G.9961 (g.hn), IEEE P1901, Homeplug, ITU-T g.hnem, IEEE P1901.2 and other related standards for coaxial cable like Moca. It is believed that a group of networks sharing a communication channel and having the proposed scheme implemented will see minimized mutual interference between the network nodes of neighboring networks, with channel resources shared efficiently and equitably between competing networks.

Coordination between Two Domain Masters

Figure 1:
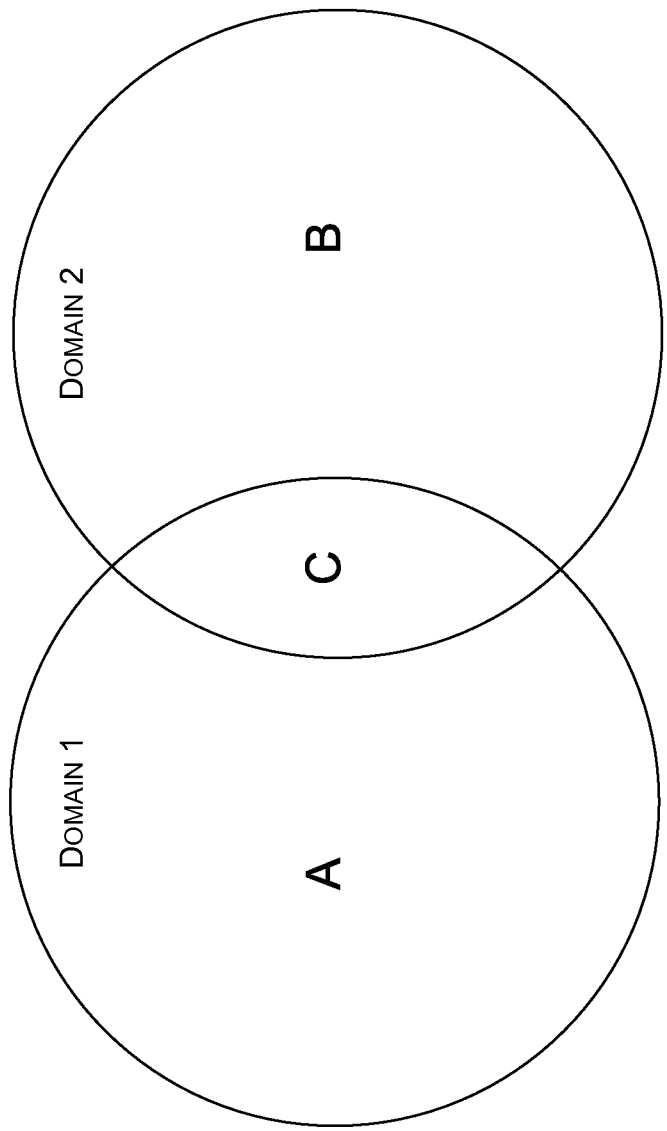
FIG. 1 illustrates coordination between two domain masters of mutually-interfering neighboring networks in accordance with the present disclosure.

FIG. 1 illustrates coordination between two domain masters of mutually-interfering neighboring networks in accordance with the present disclosure.

In the example shown in FIG. 1, two domains, domain 1 and domain 2, of two neighboring networks interfere with each other. As one or more network nodes of each of the two neighboring networks compete for the same physical medium with one or more network nodes of the other of these neighboring networks, the neighboring networks that mutually interfere with each other are also referred to as competing networks and domain 1 and domain 2, as mutually-interfering domains, can be referred to as neighboring domains, competing domains or interfering domains. Each of domain 1 and domain 2 includes a domain master (DM) and a respective number of network nodes. In FIG. 1, domain 1 contains a set of network nodes, denoted as the set A, that do not interfere with network nodes in domain 2, and domain 2 contains a set of network nodes, denoted as the set B, that do not interfere with network nodes in domain 1. There is also a set of network nodes from both domain 1 and domain 2, denoted as the set C, and each network node of the set C causes mutual interference with at least one other network node in the domain that it does not belong to. That is, a domain 1 network node in the set C interferes with at least one network node in domain 2 and this node may also be interfered by at least one network node in domain 2. Likewise, a domain 2 network node in the set C interferes with at least one network node in domain 1 and this node may also be interfered by at least one network node in domain 1. In the case of symmetric channels, a node in a domain that interferes with a node in another domain is also interfered by one or more nodes from another domain, but this is not necessarily true in the case of asymmetric channels.

Each DM generates a schedule of transmit opportunities that are allocated to either individual network nodes or multiple network nodes that are part of the network. Typically, this schedule is generated periodically every Media Access Control (MAC) cycle. In the case of communications over electrical power lines (PLC), the MAC cycle is synchronized with the AC (Alternating Current) cycle of the electrical power and has the periodicity of the two AC cycles, which is either 40 ms or 33.33 ms depending on whether the frequency of the AC cycle is 50 Hz or 60 Hz, respectively. For other types of wireline communication media, the periodicity of the MAC cycle is typically in the order of 10 ms to 100 ms.

Whenever the DM of a network detects another neighboring network, it first needs to match the network's MAC cycle duration with that of the neighboring network. Once the MAC cycle durations are matched, the DM needs to align the MAC cycle start and end points with those of the neighboring network. Afterwards, both of the neighboring networks have approximately same time slices of the physical medium that the DM in each of those networks breaks into time slots and allocates to its respective network nodes. Without any coordination between the DMs, when generating the schedule, it is likely that one or more same or overlapping time slots may be allocated to network nodes of the two neighboring networks that interfere with each other. This can result in lower throughput due to collisions and interference that result in retransmissions.

In order to coordinate the allocation of time slots, both DMs of domain 1 and domain 2 of FIG. 1 need to come up with a list of network nodes that mutually interfere. First, the DMs run some channel probing procedure to estimate which network nodes are to be considered as one of the network nodes in the set C. The ongoing transmissions before coordination can also be used for this purpose. Next, an inter-domain messaging protocol is used for the two DMs to exchange information regarding this set of network nodes along with a list of the interfering network nodes in neighboring domains. There are several ways to implement this kind of inter-domain messaging protocol prior to coordination, one of which is to use the Registration Contention Based Time Slot (RCBTS) that is typically used to enable registration of new nodes to a domain. Another possibility is to allocate a time slot at the beginning of the MAC cycle of all uncoordinated domains after aligning the MAC cycle and a time slot in the time slice owned by a DM after coordination with other DMs. This time slot can then be used for inter-domain messaging protocol.

In one embodiment, which applies to the case of two neighboring domains as well as more than two neighboring domains, each DM determines which one or ones of the network nodes in its respective domain suffer from interference by one or more network nodes from a neighboring domain. In another embodiment, each DM determines which one or ones of the network nodes in each neighboring domain interfere with one or more network nodes in its respective domain. Alternatively, each DM is capable of determining: (1) which one or ones of the network nodes in its respective domain suffer from interference by one or more network nodes from a neighboring domain; and (2) which one or ones of the network nodes in each neighboring domain interfere with one or more network nodes in its respective domain. After having determined such information, the DMs of the neighboring domains exchange such information, a list of network nodes in its domain being interfered, a list of network nodes in neighboring domain(s) that are interfering, or both, so that each DM participating in the coordination scheme is updated with the complete picture in order to coordinate to achieve the objective of the present disclosure. Alternatively or additionally, this information can also be sent by each DM to the system operator's management entity.

The key feature of this technique is that a novel and non-obvious concept of ownership of the physical medium is introduced, whereby the available time is allocated between the competing networks according to the configuration set by the system operator's management entity (e.g., service provider). Typically, if the services provided through the neighboring networks are the same, then the MAC cycle is divided equally between the neighboring networks. For example, the MAC cycle can be divided into multiple non-overlapping time slices, each time slice is then allocated to the DM of a respective one of the neighboring domains, and the DM can further manage the transmission by the network nodes in its respective domain within the allocated time slice. This mode is referred to as the default setting mode herein. However, if different categories of service level are desired by the service provider, division of the network resources can be in the proportion dictated by the configuration set by the service provider. This additional flexibility in allocation is an enhancement to the underlying technique proposed herein and, for ease of description in some cases and in the interest of brevity, only the default setting mode is explained.

Each DM has a unique 48-bit Ethernet MAC address that is used to identify the device which functions as a domain master for the respective network. In one embodiment, the output of a scrambler through which the numerically ordered reverse MAC addresses of the coordinating DMs are passed through are used to determine the order in which the non-overlapping time slices of MAC cycles are allocated to the neighboring domains. It is to be noted that this is just one way of pseudo-randomly determining the order in which the time slices are allocated to the neighboring domains. Other means of determining the order known to those skilled in the art are also covered within the scope of the present disclosure.

The concept is that each DM has a management module therein that generates and sends out control messages and manages the operation of its respective domain. Each node in a domain also has a management module therein to support the control messages and associated functionality. The identity of the management module of a node is synonymous with the identity of that node. A domain master is typically a node in the domain but with additional functionality. Other nodes and the DM of a have a one- or two-byte device ID (DEVICE_ID) for identification within the domain. However, for communications with devices outside the domain, a larger unique identifier is used. Typically for devices inside the wireline network that support bridging with Ethernet, this identifier is the Ethernet MAC address of the node. This identifier is also used by a new node attempting to join a domain, before the domain master assigns a DEVICE_ID unique within the domain to the node that intends to join the domain. In that context it is also referred to as a registration ID (REG_ID). In other words, a nodes' REG_ID is typically the same as the node's Ethernet MAC address.

The basic idea is that the DMs of neighboring domains are pre-configured with the algorithm in advance, and that the order in which the time slots are allocated to the neighboring domains is generated from device identifiers of DMs, and once the DMs of neighboring domains are made aware of the device identifiers of other DMs, the DMs can coordinate allocation of time slots and ordering of transmission across the neighboring domains. There are several ways in which DM of a domain can become aware of the device identifiers of other DMs of neighboring domains, prior to the coordination. One such method is to require communication of the device identifier of the DM in the schedule generated by the DM (also known as Media Access Plan) for every MAC cycle that is communicated to all the nodes in its domain. The nodes from the neighboring domains that can decode this message can then communicate the information to their respective DMs. Other method is for all nodes suffering interference to sniff the traffic in neighboring domains and determine the device identifier of the DM for those domains.

In the example shown in FIG. 1, the DM of domain 1 is free to allocate any portion of the time during the MAC cycle to network nodes in the set A. Similarly, the DM of domain 2 is free to allocate any portion of the time during the MAC cycle to network nodes in the set B. However, under the proposed technique, either DM can allocate only the time that it owns to its associated network nodes in the set C. If the DM of domain 1 or domain 2 needs additional time allocation for its network nodes in the set C, from a time duration that is not currently assigned to the DM, then it needs to request the other DM for permission of such allocation and use the time duration only if the requested time is granted by the other DM. The granting of permission is for negotiated time duration and at the end of that time duration the request needs to be renewed, if required. The requested time duration can be cancelled at any time by the requesting DM, for example, by sending an indication to the granting DM, and credits can be reclaimed if applicable in some embodiments. Conceptually this scheme is similar to the process of leasing property owned by another party as stated below as a general case applicable to the case of two or more neighboring domains participating in the coordination scheme.

When a DM recognizes that it needs additional time allotment in order for one or more of the network nodes in its domain to transmit or receive data, the DM may request to lease the allotment of a time slot for access to the physical medium from the DM or DMs of its one or more neighboring domains. This way, if a neighboring DM grants the request for leasing the time slot, the network nodes that may cause interference with network nodes in those neighboring domains may be able to transmit or receive during that time without interference even if the DM requesting to lease does not own that time. The disclosed method simplifies the process of negotiating with other DMs by introducing the novel and non-obvious concept of single ownership of the time slot that allows negotiating with a single DM for a given time slot, rather than dealing with multi-party negotiations with multiple DMs.

In one embodiment, a credit system may be used where each DM is pre-assigned a respective number of credits, by a system operator that has control over configurations of all coordinating DMs or by other means. The idea here is that credits are a standard currency used in transactions between any two coordinating DMs, not something that a DM can arbitrarily assign to itself. Under the credit system, each DM is pre-assigned a respective number of credits, using a method that ensures that the credits are mutually recognized by the coordinating DMs and can be exchanged just like a common currency.

When a requesting DM (leaser) and a granting DM (owner) negotiate with each other in real-time regarding the lease of a time slot from the owner to the leaser, the leaser and owner can exchange credits to keep track of the leasing of resources. In this case, it may be configured such that the goal for each DM is to maximize the credits it collects. The objective here is the credit-maximizing system tends to lead to better overall utilization of the physical medium. In one embodiment, the number of credits offered by a DM for access to its neighbor's time allotment depends proportionately on the priority of its traffic at that moment in time and urgency of its requirement for additional medium time. In another embodiment, a system operator can configure the relative priority in accessing the physical medium by configuring the initial number of credits assigned to each DM. In another embodiment, the initialization, exchange and maintenance of credit balance is done through secure communications with a system operator's management entity that has ability to configure each of the DMs.

Coordination among Three Domain Masters

Figure 2:
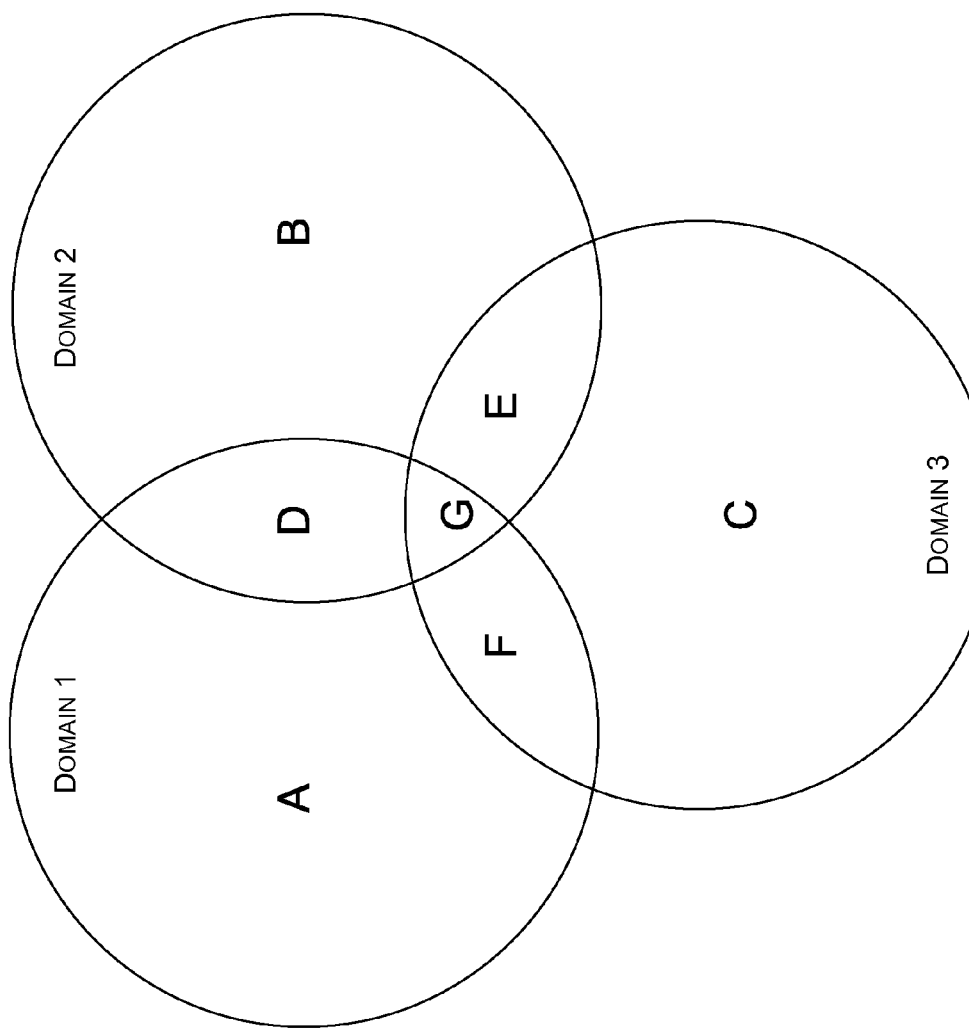
FIG. 2 illustrates coordination among three domain masters of mutually-interfering neighboring networks in accordance with the present disclosure.

FIG. 2 illustrates coordination among three domain masters of mutually-interfering neighboring networks in accordance with the present disclosure.

As shown in FIG. 2, three neighboring domains can see each other and each domain is subject to interference due to transmission from network nodes belonging to the two other neighboring domains. Domain 1 contains a set of network nodes, denoted as the set A, that do not interfere with network nodes in domain 2 and domain 3. Domain 2 contains a set of network nodes, denoted as the set B, that do not interfere with network nodes in domain 1 and domain 3. Domain 3 contains a set of network nodes, denoted as the set C, that do not interfere with network nodes in domain 1 and domain 2. A set of network nodes from both domain 1 and domain 2, denoted as the set D, contains network nodes each of which causes mutual interference with at least one other network node in the domain that it does not belong to among those two domains—domain 1 and domain 2. A set of network nodes from both domain 2 and domain 3, denoted as the set E, contains network nodes each of which causes mutual interference with at least one other network node in the domain that it does not belong to among those two domains—domain 2 and domain 3. A set of network nodes from both domain 1 and domain 3, denoted as the set F, contains network nodes each of which causes mutual interference with at least one other network node in the domain that it does not belong to among those two domains—domain 1 and domain 3. A set of network nodes from domain 1, domain 2 and domain 3, denoted as the set G, contains network nodes each of which causes mutual interference with at least one other network node in each of the other two domains that it does not belong to. That is, a domain 1 network node in the set G interferes with at least one network node in each of domain 2 and domain 3, and may also be interfered by at least one network node in each of domain 2 and domain 3. A domain 2 network node in the set G interferes with at least one network node in each of domain 1 and domain 3, and may also be interfered by at least one network node in each of domain 1 and domain 3. Similarly, a domain 3 network node in the set G interferes with at least one network node in each of domain 1 and domain 2, and may also be interfered by at least one network node in each of domain 1 and domain 2.

As discussed earlier, transmissions from network nodes in the sets A, B, and C can occur at any time during the MAC cycle, since they do not interfere with network nodes from neighboring domains. The DMs can schedule time slots in any part of the MAC cycle, for network nodes belonging to the sets A, B, and C. On the other hand, transmission from network nodes that belong to set G requires coordination among the three DMs. The approach used in this case is similar to the case described earlier for DMs of two neighboring, or competing, domains. Here, the MAC cycle is allocated to three DMs according to the proportion dictated by the service provider. By default the MAC cycle is allocated in equal proportion, e.g., each domain is allocated one-third of the MAC cycle.

In one embodiment, the numerically ordered reversed MAC addresses of the DMs passed through a scrambler are used to determine the order in which the portions of the MAC cycle are allocated to the neighboring domains. The transmissions from network nodes in the sets D, E, and F are allowed within the one-third of the MAC cycle allocated for the corresponding domain that those network nodes belong to. However, in this embodiment, one of the slots allocated earlier is unused and is divided among the neighboring domains in the same proportion in which the original MAC cycle is divided. For example, the network nodes in the set D that belong to domain 1 can transmit in the allocated time (which is one-third of the Mac cycle by default). Additionally, those network nodes can also transmit in half of the allocated time (for default setting) for domain 3 as network nodes in the set D do not interfere with network nodes in domain 3.

In another embodiment, a pre-determined ordering algorithm, which generates a unique pseudo-random order from the unique device identifiers or MAC addresses of the DMs of each of the neighboring domains that participate in the coordination scheme, can be used as the means of determining the order.

In one embodiment, at least one MAC cycle is divided in equal proportion among the different neighboring domains that participate in the coordination scheme. Alternatively, at least one MAC cycle is divided in proportion according to a setting by a user, such as an operator of the service provider, among the different neighboring domains that participate in the coordination scheme.

Each DM is free to allocate transmit opportunities to its network nodes from its own allocation. If additional time is needed for any of its network nodes, then the DM can request the DM that owns the time allocation from which additional time is desired, for such allocation and use it only if the request is granted by that DM. The granting of permission is for negotiated time duration and at the end of that time duration the request needs to be renewed, if required beyond the negotiated time duration. The requested time duration can be cancelled at any time by the requesting DM by sending an indication to the other DM, and may lead to refund of credits in some embodiments. Conceptually the scheme is similar to the process of leasing property owned by another party as discussed earlier.

In addition, different leasing policies may be implemented. For example, a policy may be that the owner of resources (i.e., time slots for accessing the physical medium) will always lease the resources when it is not planning on using the resources, such as when none of the network nodes in the domain of the owner DM is expected to be receiving or transmitting during the to-be-leased time slot. Additionally or alternatively, a policy may be that the owner of resources will always lease the resources when the priority of traffic for which the resources are needed by the requesting DM is higher than the priority of traffic for which the owner DM is expected to use the to-be-leased time slot. Additionally or alternatively, a policy may be that the owner of resources will negotiate with the leaser and lease the resources only when there is a mutual agreement on the number of credits to be exchanged for the leased resources. Additionally or alternatively, a policy may be that the owner of resources will lease part or all of the requested resources to be used in a Carrier Sense Multiple Access (CSMA) transmit opportunity. Additionally or alternatively, a policy may be that the owner of resources will lease part or all of the requested resources to be used in an Orthogonal Carrier Sense Multiple Access (OCSMA) transmit opportunity, where interfering nodes in each domain use mutually orthogonal preambles (i.e., orthogonal to the preambles for nodes in coordinating domains, but same as the ones in its own domain) for transmission. This is so that both the owner and the leaser can use the time as long as they respect transmissions from each other's domain and follow a back-off procedure. The use of orthogonal preambles minimizes cross-correlation between different preambles. Additionally or alternatively, all these policies could be based on reciprocity from the leaser, which in the case of CSMA and OCSMA transmit opportunities is also referred to as "pooling of resources" in this disclosure.

Coordination among N Domain Masters

As is clear from the above description for the case of two neighboring domains and the case of three neighboring domains, the same concept can be generalized and applied to the case of N number of neighboring domains. For the case of network nodes that interfere with network nodes in (N-1) other domains, the MAC cycle is divided into N non-overlapping time slots and ownership of each of those time slots is assigned in the order determined by, for example, passing the reversed MAC addresses through a scrambler as described above. Since each DM is familiar with the allotment of the time slots, leasing of time slots belonging to another DM can be done by the negotiation procedure with that DM as described above. The novel concept here is that instead of multi-party negotiations with multiple DMs for the same time slot, the negotiation is between a leaser DM and an owner DM. The owner of a time slot can schedule any of its network nodes to transmit in the time slot without any fear of interference from the neighboring domains. Also, since the neighboring domains are aware of this division and allotment of time slots, they can schedule the network nodes that may be affected by the interference from the network nodes of the owner of a time slot to be in sleep mode during this period. This ensures that there will be no destructive interference between the transmissions.

Non-Symmetric Channels

In the examples described above, a tacit assumption is made that the channels between any two network nodes in a wireline medium are symmetric channels. That is, if transmission from network node 1 in domain 1 interferes with the transmission from network node 2 in domain 2 as seen by other network nodes in domain 2, then transmission from network node 2 in domain 2 also interferes with the transmission from network node 1 in domain 1 as seen by other network nodes in domain 1. Under this assumption there is no need for a DM to explicitly communicate the list of interfering network nodes to its neighboring DM or DMs, since the DMs may determine the interfering network nodes by inference.

This approach, however, is not sufficient in the case of non-symmetric channels like powerline. Nevertheless, the technique described above is still valid for the case of non-symmetric channels. For the example in FIG. 1 with two neighboring domains, network nodes in the set A are those network nodes from domain 1 that do not interfere with any of the network nodes in domain 2. Likewise, network nodes in the set B are those network nodes from domain 2 that do not interfere with any of the network nodes in domain 1. There are two other sets $C_A$ and $C_B$. Network nodes in the set $C_A$ are the network nodes in domain 1 that interfere with at least one network node in domain 2. Network nodes in the set $C_B$ are the network nodes in domain 2 that interfere with at least one network node in domain 1. For the generic case of non-symmetric channel, the DM of domain 1 reports the set $C_B$ to the DM of domain 2, and the DM of domain 2 reports the set $C_A$ to the DM of domain 1. The DM of domain 1 is then free to allocate network nodes in $C_A$ to the time that it owns. If it needs additional time then it can request the DM of domain 2 for additional time as described earlier. The DM of domain 2 may then schedule the network nodes that are subject to interference from network nodes in $C_A$ in sleep mode during the time that domain 1 owns. In case of non-symmetric channels, this set of network nodes may in general be different than the network nodes in the set $C_B$. In case of symmetric channels, this set of network nodes may be same as the network nodes in the set $C_B$.

For the example in FIG. 2, the same approach works for non-symmetric channel. In this case there are additional sets $D_A$, $D_B$, $E_B$, $E_C$, $F_C$, $F_A$, $G_A$, $G_B$ and $G_C$. These additional sets are generated based on the information communicated by the DMs of neighboring domains regarding the one or more network nodes in a domain that interfere with one or more other network nodes in the neighboring domains. The set $D_A$ is a set of network nodes in domain 1 that interfere with at least one network node in domain 2. The set $D_B$ is a set of network nodes in domain 2 that interfere with at least one network node in domain 1. $E_B$, $E_C$, $F_C$ and $F_A$ can be defined in a similar fashion. The set $G_A$ is a set of network nodes in domain 1 that interfere with at least one other network node in domain 2 and at least one other network node in domain 3. $G_B$ and $G_C$ can be defined in a similar fashion.

As is clear from the above description for the case of two neighboring domains and three neighboring domains, the same concept can be generalized and applied to N number of neighboring domains. For the case of network nodes that interfere with network nodes in (N-1) other domains, the total MAC cycle is divided into N independent time slots and ownership of each of those time slots is assigned in the order determined by, for example, passing the reversed MAC address through a scrambler as described above. Since the DM of each neighboring domain is familiar with the allotment of the time slots, transmissions can be scheduled without interference and leasing of time slots belonging to a DM can be done by the negotiation procedure as described above.

Credit System and Real-Time Auction Model

In one embodiment, each of the DMs starts with a certain pre-configured number of credits established by the system operator, when it recognizes one or more of the other domains and starts communicating with the respective DM or DMs for coordination according to the techniques described above. After coordination, a DM can start to request time slots from another DM using a negotiation protocol. For such requests, the requesting DM offers certain number of credits. If the receiving DM agrees to the offer, it accepts those credits and offers the time slot as requested. If the receiving DM does not agree to those credits, then it can make a counter-offer. The negotiation continues in this manner and may end up either in completion of a deal or withdrawal of the offer. The goal of each DM under this approach is to maximize its cumulative credits. The system operator can offer different categories of services and allocate different number of initial credits to each of the networks. This technique is useful in situations where a single physical medium is shared by different owners operating neighboring networks. It ensures fair and equitable sharing of common network resources without causing destructive interference. It also offers an incentive for the DMs to come up with a good scheduling algorithm that enables fair sharing of common network resources with neighboring domains. In another embodiment, at least one or more of the DMs can offer the time slots that it owns, but does not need or does not intend to use for its nodes, for lease to other DMs for a number of credits decided in real-time depending on the supply-and-demand dynamics. The DM can rearrange and reschedule its internal allotment for nodes in its domain with a goal of maximizing its credits by offering for lease unused time slots to the DM which offers most credits for those time slots.

Alternatively or additionally, the system operator's management entity can act as an intermediary in facilitating exchange of credits and maintenance of credit balances during transactions between an owner DM and a leaser DM.

Illustrative Coordination among Three Domain Masters

Figure 3:
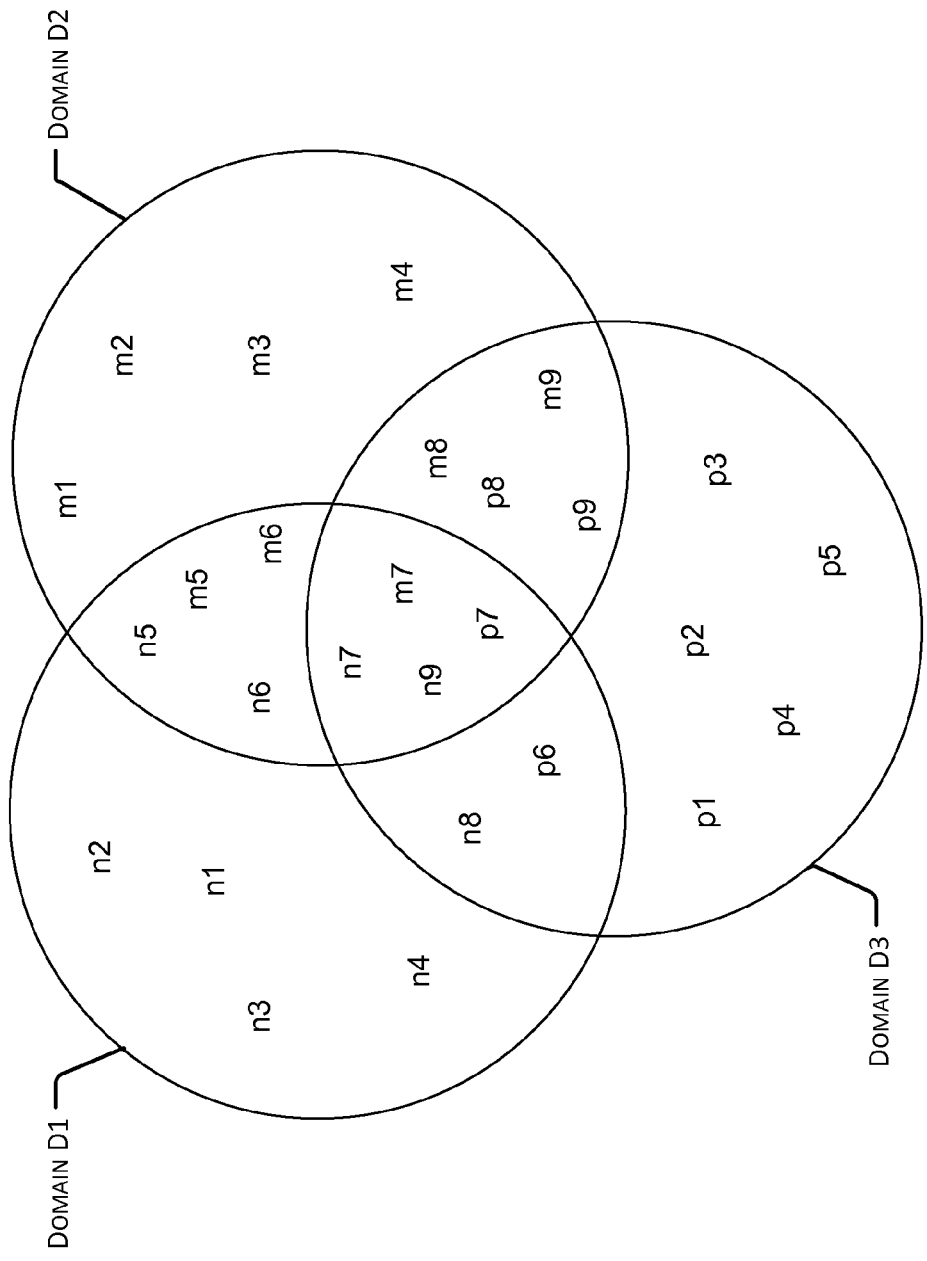
FIG. 3 illustrates coordination among three domain masters of mutually-interfering neighboring networks with network nodes shown in accordance with the present disclosure.
Figure 4:
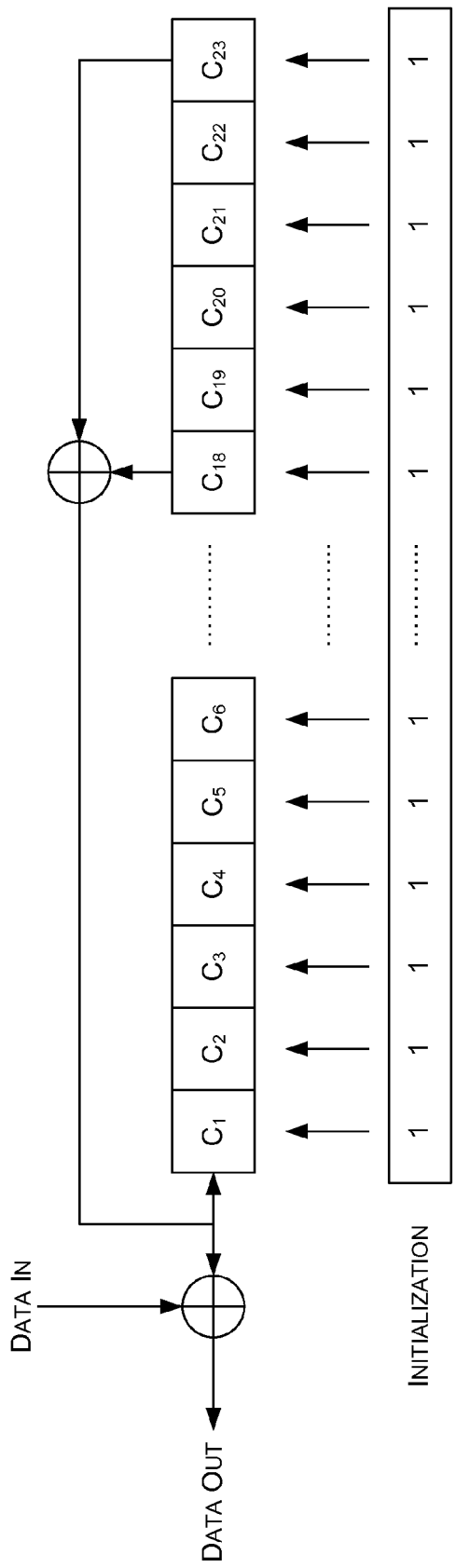
FIG. 4 illustrates a scrambler used in generating an ordering of coordinating domain masters in accordance with the present disclosure.

FIG. 3 illustrates coordination among three domain masters of mutually-interfering neighboring networks with network nodes shown in accordance with the present disclosure. FIG. 4 illustrates a scrambler used in generating an ordering of coordinating domain masters in accordance with the present disclosure.

As shown in FIG. 3, some of the network nodes in each of domain D1, domain D2 and domain D3 experience interference from network nodes in neighboring domains. For illustrative purpose only, as an example it is assumed that the reversed MAC addresses for DMs of D1, D2 and D3 are 20-c5-5e-5a-e8-b8, 33-a8-fa-6f-79-0a, and 3d-ab-74-b9-76-3d, respectively (all are randomly chosen in this example). In one embodiment, the scrambler used for generating the ordering is as shown in FIG. 4, which is the same as the scrambler used in ITU-T g.9960 for scrambling data. In other embodiments, the actual scrambler used may be different than that shown in FIG. 4, as long as it has good randomizing properties and is known a priori to all DMs that implement the disclosed techniques.

In this example, the corresponding 18 bytes fed into the scrambler are: 0x20 0xc5 0x5e 0x5a 0xe8 0xb8 0x33 0xa8 0xfa 0x6f 0x79 0x0a 0x3d 0xab 0x74 0xb9 0x76 0x3d. Accordingly, the 18 bytes output by the scrambler are: 0x20 0xc5 0xa2 0xde 0x01 0x93 0xdb 0x64 0x5d 0x91 0xbe 0xe1 0x8f 0xf2 0xbb 0x34 0x60 0xb2. The last three bytes at the output of the scrambler are 0x34, 0x60 and 0xb2, where 0x34 corresponds to D1, 0x60 corresponds to D2 and 0xb2 corresponds to D3, since the input data is fed to the scrambler in that order. In this case it turns out that the ordering is D1-D2-D3, since 0x34<0x60<0xb2. In the event of a tie, in one embodiment the ordering of the original reversed MAC address is followed to break the tie. In this example, the allocation of portions of MAC cycle is in the order D1, D2 and D3. Since all the DMs use the same input data and the same algorithm, this order is consistently inferred across the domains D1, D2 and D3, and this is important for the techniques proposed herein to work.

From FIG. 3, it is clear that network nodes n1, n2, n3 and n4 in domain D1 do not suffer any interference that requires coordination with neighboring domains. Similarly, network nodes m1, m2, m3 and m4 in domain D2 do not suffer any interference requiring coordination, and network nodes p1, p2, p3, p4, and p5 in domain D3 do not suffer any interference requiring coordination. The DMs of D1, D2 and D3 are free to schedule transmissions from these network nodes at any time during the MAC cycle.

All other network nodes suffer interference from at least one other network node in either or both of the neighboring domains, as listed in Table 1 below.

TABLE 1

List of Interfering Network nodes from Neighboring Domains

| Network node | Interfering Network node(s) from Neighboring Domain(s) |
|---|---|
| n5 | m5, m6 |
| n6 | m6 |
| n7 | m7, p7 |
| n8 | p6 |
| n9 | m7, p7 |
| m5 | n5 |
| m6 | n5, n6 |
| m7 | p7, n7, n9 |
| m8 | p8, p9 |
| m9 | p9 |
| p6 | n8 |
| p7 | n7, n9, m7 |
| p8 | m8, m9 |
| p9 | m8 |

This information about transmissions from network nodes belonging to neighboring domains interfering with the transmissions from network nodes in a domain is generated during a probing phase and communicated to the neighboring domains. Alternatively or additionally, this can also be generated based on the ongoing transmissions prior to the coordination. This information is periodically updated and also updated when the number of interfering network nodes in any domain changes as inferred from ongoing transmissions after coordination. Alternatively or additionally, this information can also be updated using special probing signals after coordination. After any update, a synchronizing technique is needed to transition all domains from one allotment to another allotment, when certain events result in a new allotment (for example—a new domain with interfering nodes comes up, an existing domain with interfering nodes shuts down, DM in any of the coordinating domains changes, or significant change in interference from one or more nodes of any of the coordinating domains, etc.). For example, each MAC cycle can be assigned a cycle number which is synchronously maintained by all the coordinating DMs. In one embodiment, the DM with the first allocation in the MAC cycle can be responsible for initiating a synchronizing counter, which is then maintained by all coordinating domains. A specific value of this synchronous counter that is accepted by all DMs can be used for transitioning from one allotment to another, so that the transition is seamless. This same technique can also be used when a new domain comes up that needs coordination or when an existing domain shuts down, for example. This technique can also be used to update the allocations, when the DM for an existing domain is changed for any reason.

This information is then reported by each DM to its neighboring DMs. For this example, the report may be like that shown in Table 2 below.

TABLE 2

Reports of Interfering Network nodes

| Reporting Domain | Network nodes Reported in D2 | Network nodes Reported in D3 |
|---|---|---|
| D1 | m5, m6, m7 | p6, p7 |

| Reporting Domain | Network nodes Reported in D1 | Network nodes Reported in D3 |
|---|---|---|
| D2 | n5, n6, n7, n9 | p7, p8, p9 |

| Reporting Domain | Network nodes Reported in D2 | Network nodes Reported in D1 |
|---|---|---|
| D3 | m7, m8, m9 | n7, n8, n9 |

Once a DM receives the reports about its interfering network nodes from all other DMs interested in coordination, it processes that information and generates a coordination table as shown in Table 3 below.

In one embodiment, each DM communicates its coordination table to other DMs that it is interested in coordinating with. The DM among the coordinating domains, that needs to coordinate with maximum number of other DMs, sets up the final coordination table, and communicates it to the other coordinating domains. This DM which communicates the final coordination table to the DMs of other coordinating domains is referred to as the coordinator hereinafter. In case of an update of an existing allotment, the coordinator also communicates the proposed value of the synchronous counter to other coordinating DMs when the update should take effect. If a DM that is indicated as a coordinating domain by the coordinator accepts the proposal, such DM confirms the acceptance of the proposal to the coordinator by replying with an acknowledgment message. If all the DMs indicated for coordination by the coordinator confirm, then the coordinator sends a binding proposal and indicates the value of the synchronous counter when it would take effect. If a DM receives a proposal to coordinate with more DMs than the number of DMs it is currently coordinating with, it shall accept that proposal and indicate the acceptance of that proposal to the coordinator. This method is referred to as distributed coordination.

In another embodiment, each DM communicates its coordination tables to the system operator's management entity. This entity collects all the information reported by DMs, processes the information to generate a final coordination table, and communicates it to the coordinating domains. This entity also indicates the value of a synchronous counter when the allotment according to the final coordination table takes effect. This method is referred to as centralized coordination.

TABLE 3

Coordination Table

| Coordinating Domain | Network nodes to be Coordinated with D2 | Network nodes to be Coordinated with D3 | Network nodes to be Coordinated with D2 & D3 |
|---|---|---|---|
| D1 | n5, n6 | n8 | n7, n9 |

| Coordinating Domain | Network nodes to be Coordinated with D1 | Network nodes to be Coordinated with D3 | Network nodes to be Coordinated with D1 & D3 |
|---|---|---|---|
| D2 | m5, m6 | m8, m9 | m7 |

| Coordinating Domain | Network nodes to be Coordinated with D1 | Network nodes to be Coordinated with D2 | Network nodes to be Coordinated with D1 & D2 |
|---|---|---|---|
| D3 | p6 | p8, p9 | p7 |

From Table 3, the following conclusions can be drawn:
1. D1 needs to coordinate transmissions from n5 and n6 with D2.
2. D1 needs to coordinate transmissions from n8 with D3.
3. D1 needs to coordinate transmissions from n7 and n9 with D2 and D3
4. D2 needs to coordinate transmissions from m5 and m6 with D1.
5. D2 needs to coordinate transmissions from m8 and m9 with D3.
6. D2 needs to coordinate transmissions from m7 with D1 and D3.
7. D3 needs to coordinate transmissions from p6 with D1.
8. D3 needs to coordinate transmissions from p8 and p9 with D2.
9. D3 needs to coordinate transmissions from p7 with D1 and D2.

Based on the above information, the three domains D1, D2 and D3 conclude that they need to coordinate and the coordination is among those three domains. In this example, each of the three DMs would reach the same conclusion that they need to coordinate with the other two DMs. Thus, under the distributed method, whichever DM sends the proposal for coordination becomes the coordinator, and other DMs agree to the proposal for coordination, as described earlier. Under the centralized method, all three DMs send their coordination table to the service provider's management entity, which then generates a final coordination table and sends the coordination table to all three DMs.

The distributed method is suitable when co-ordination is required amongst small groups of domains which are sufficiently isolated from other groups of domains. The centralized method is suitable when co-ordination is required amongst large groups of domains which may not be sufficiently isolated from other groups of domains. Also the distributed method is applicable when the management entity for the system provider, does not have ability and access to control and configure all of the domains trying to co-ordinate with each other.

In one embodiment, D1, D2 and D3 reverse their MAC addresses and provide them to a scrambler in the numerical order of the reversed MAC addresses. In one embodiment, the last byte at the output of the scrambler corresponds to the domain with the highest reversed MAC address, the penultimate byte at the output of the scrambler corresponds to the domain with the next lower reversed MAC address, and the byte before that at the output of the scrambler corresponds to the domain with the lowest reversed MAC address. The domain corresponding to the numerically lowest byte owns the first one-third of the MAC cycle and domain with the numerically next higher byte owns the second one-third of the MAC cycle and the domain with the numerically highest byte owns the last one-third of the MAC cycle.

Illustrative MAC Cycle Division for Three Coordinating Domain Masters

FIG. 5 illustrates MAC cycle division for three coordinating domain masters in accordance with the present disclosure.

In the general case, for M number of coordinating domains $D_1, D_2 \ldots D_M$, the reversed MAC addresses of the corresponding DMs are fed through a scrambler in the numerical order, and the numerical order of the last M bytes at the output of the scrambler is used to determine the ownership of the corresponding (1/M)th portions of the MAC cycle.

Figure 5A:
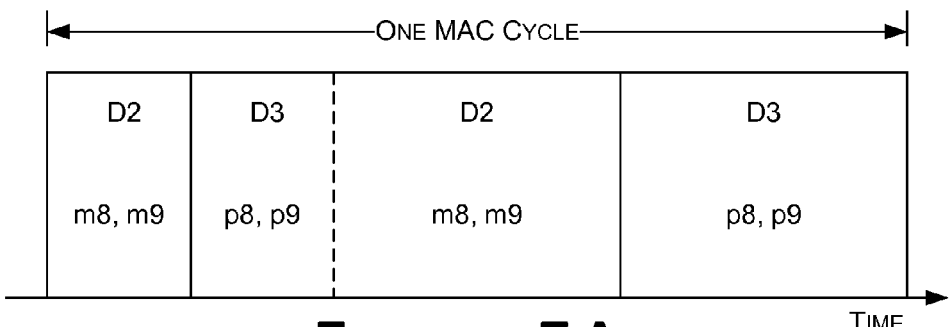
FIGS. 5A-5D illustrate MAC cycle division for three coordinating domain masters in accordance with the present disclosure.
Figure 5B:
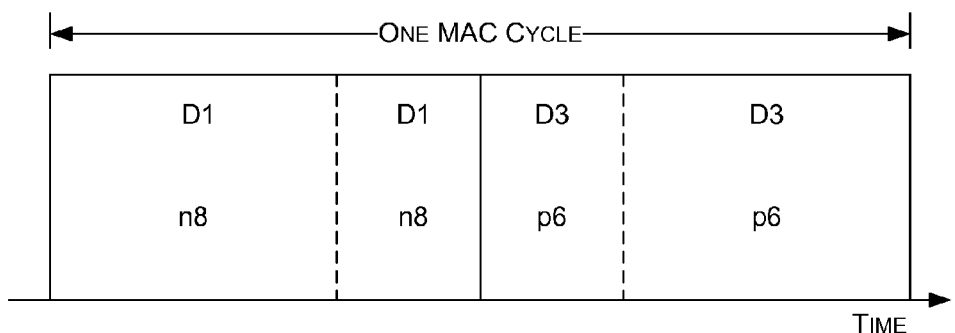
Figure 5C:
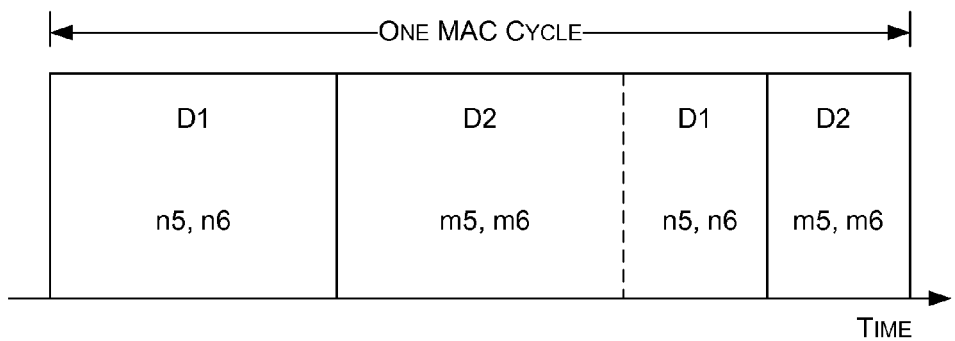
Figure 5D:
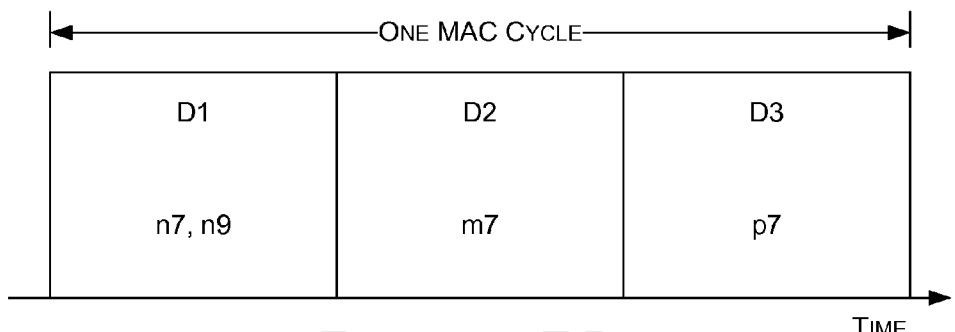

For illustrative purpose only it is assumed that the relative ordering in this example turns out to be D1-D2-D3. Another assumption is that the service provider configures all the domains equally in terms of priority of access to the physical medium. Based on these assumptions, the following conclusions can be made:
1. Network nodes n5 and n6 are only allowed to transmit in one half (⅓+⅙) of the MAC cycle, as shown in FIG. 5C.
2. Network nodes m5 and m6 are only allowed to transmit in one half (⅓+⅙) of the MAC cycle, as shown in FIG. 5C.
3. Network nodes m8 and m9 are only allowed to transmit in one half (⅙+⅓) of the MAC cycle, as shown in FIG. 5A.
4. Network nodes p8 and p9 are only allowed to transmit in one half (⅙+⅓) of the MAC cycle, as shown in FIG. 5A.
5. Network node p6 is only allowed to transmit in one half (⅙+⅓) of the MAC cycle, as shown in FIG. 5B.
6. Network node n8 is only allowed to transmit in one half (⅓+⅙) of the MAC cycle, as shown in FIG. 5B.
7. Network nodes n7 and n9 are only allowed to transmit in one-third of the MAC cycle, as shown in FIG. 5D.
8. Network node m7 is only allowed to transmit in one-third of the MAC cycle, as shown in FIG. 5D.
9. Network node p7 is only allowed to transmit in one-third of the MAC cycle, as shown in FIG. 5D.

Once the DM of a domain informs the DMs of the neighboring domains with which it is coordinating, about the network nodes in its domain with restricted access to the MAC cycle, those DMs can use that information for scheduling transmissions in a way that avoids interference from the network nodes associated with the coordinating DM. Using this technique, all domains can operate without destructive interference. For example, in this case once D1 informs D2 that it is going to coordinate transmissions from network nodes n5 and n6, D2 infers that network nodes n5 and n6 are scheduled only during half (⅓+⅙) of the MAC cycle and therefore network nodes m5 and m6 can both transmit and receive during the other half (⅓+⅙) of the MAC cycle without any possibility of interference from transmissions in D1.

Illustrative MAC Cycle Division for Four Coordinating Domain Masters

Figure 6:
FIG. 6 illustrates MAC cycle division for four coordinating domain masters in accordance with the present disclosure.

FIG. 6 illustrates MAC cycle division for four coordinating domain masters in accordance with the present disclosure.

For simplicity of description and in the interest of brevity, it is assumed that the service provider has configured default priority (e.g., equal for all domains) for access to the physical medium. Under this assumption, FIG. 6 shows the division of MAC cycle in the cases when a DM needs to coordinate transmission with one or more other DMs of the neighboring domains. Here, the neighboring domains are D1, D2, D3 and D4.

In general, a (1/N)th portion of the MAC cycle is allocated to each DM for N coordinating domains. In this example, ¼th of the MAC cycle is allocated to each of D1, D2, D3 and D4. However, there are some network nodes for which interference is an issue in only a subset of domains. For example, if there are some network nodes that cause interference only among network nodes in domains D1, D2 and D3, the slot allocated to D4 can be divided equally among D1, D2 and D3. Note that this re-allocation of slot for D4 only applies to network nodes that cause interference among domains D1, D2 and D3. Although specific example in FIG. 6 deals with four interfering domains, the concept can be generalized and applied to N interfering domains. As long as all the domains follow consistent rules, they end up with consistent allocations. For N interfering domains, a suggested rule according to one embodiment is provided below, although it is to be understood that other possible rules may be feasible so long as all the DMs follow them consistently (and such other rules are within the scope of the present disclosure).

The steps of the suggested rule are as follows:

1. Follow the usual ordering algorithm and allot time slots to the domains. For illustrative purpose only, it is assumed that the order is D1, D2, D3 . . . DN.

2. The case of m interfering domains d1, d2 . . . dm arranged in an order which is the same as the order for those domains in the original order D1, D2, D3 . . . DN is considered. The allocation is trivial for m=1 and m=N. For m=1, domain dm is allocated the complete MAC cycle. For m=N, the MAC cycle is divided into N equal parts and allocated in the order D1, D2, D3 . . . DN. For 1<m<N, the same allocation approach is followed, but (N−m) time slots remain unallocated in the first step.

3. For allocation of those (N−m) time slots, let K=(N−m)/m. If K>0, then the technique allocates unallocated slots from the beginning of the MAC cycle to $d_1, d_2 \ldots d_m$, and this process is repeated K times. At the end of this step, there may still be L=(N−m) % m unallocated time slots.

4. Each of those L time slots is then equally divided and allocated to m domains in the order $d_1, d_2 \ldots d_m$.

In some cases the bandwidth requirements of certain network nodes in a domain cannot be met within the default constraints. Therefore a procedure to allow leasing of physical medium access time from other domains is needed. The constraints in place by the allocation algorithm can be overridden by leasing the portion of the MAC cycle for some time by one DM from the owner DM of that portion of the MAC cycle. If the owner DM agrees, then the leasing DM can use the time for transmissions by network nodes that may potentially interfere with the transmissions from network nodes associated with the owner DM. The lease has to be negotiated in advance so that the owner DM can schedule transmissions of its associated network nodes in a way that the network nodes that may interfere are not allocated transmit opportunities in the leased portion of the MAC cycle. In some cases, those network nodes may also be scheduled for sleep state during that time so that transmissions from other network nodes within the domain do not get lost due to interference from the neighboring domain that leased the portion of the MAC cycle. The procedure for leasing of physical medium access time can be similar to that described previously and, in some embodiments, involves communicating through the system operator's management entity that acts as an intermediary.

Further Enhancements

As a further enhancement to the basic scheme, the DMs of neighboring domains can also reserve part of the physical medium access time that they own for a CSMA scheme where the neighboring domains agree to respect the ongoing transmissions on the physical medium and use a back-off procedure, even if the transmissions detected originate from network nodes that are not in their domain. This enhancement allows neighboring domains to pool their resources together and have a larger time slot that can be shared between domains. This technique is especially effective in case of coordination among large number of domains, where the individual allocations may sometimes end up being small and fragmented. This kind of slots can also be used for inter-domain messaging protocol, as discussed earlier.

Moreover, in one embodiment, one or more DMs may be capable of suggesting corrective action to a user, such as a network operator of the service provider, to minimize interference and improve throughput of the overall network by, for example, turning off certain network nodes, relocating certain network nodes, or changing the routing of traffic through certain nodes using different relay paths.

Exemplary Communication Coordination Device

Figure 7:
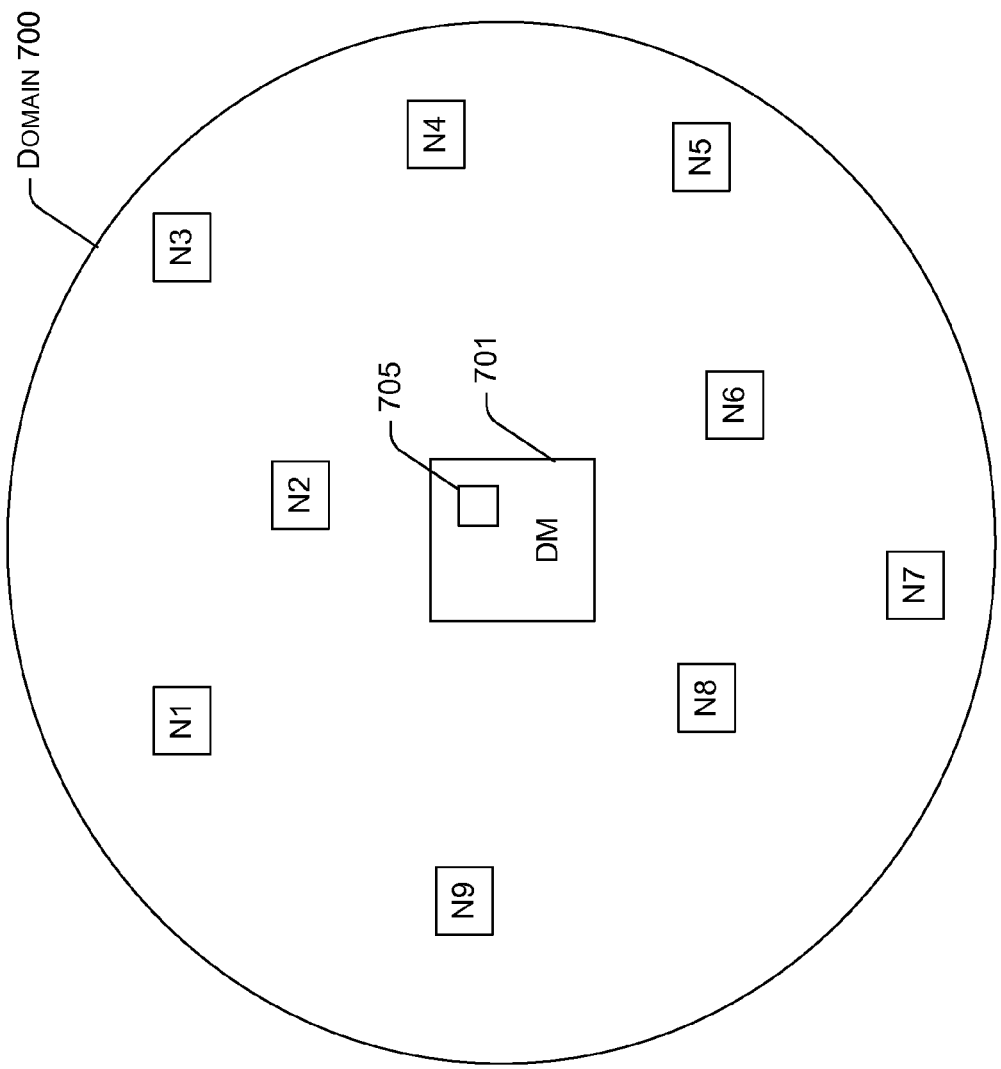
FIG. 7 illustrates a communication coordination device as part of a domain master apparatus to implement the coordination scheme in accordance with the present disclosure.

FIG. 7 illustrates a communication coordination device 705 as part of a domain master apparatus 701 of a domain 700, where the communication coordination device 705 is configured to implement the coordination scheme in accordance with the present disclosure.

As shown in FIG. 7, other than the domain master apparatus 701, the domain 700 also includes a number of network nodes such as N1, N2 . . . N9 in this example. In one embodiment, the communication coordination device 705 comprises an integrated circuit (IC), also known as a chip, which may be a standalone chip or an embedded portion of another chip. The communication coordination device 705 may be, for example, a processor chip, a communications chip, an application-specific IC (ASIC) or the like. In another embodiment, the communication coordination device 705 comprises a chip set that includes one or more chips mounted on a printed circuit board (PCB) having additional electronic components.

In one embodiment, the domain master apparatus 701 is a network router, network switch, gateway device, or computer server that functions as the DM for the domain 700, and the communication coordination device 705 is installed in the domain master apparatus 701.

When one or more neighboring domains share the same physical medium for communications with the domain 700, there may be mutual interference between at least one network node of the one or more neighboring domains and at least one of N1, N2 . . . N9 of domain 700. The communication coordination device 705 is configured to cause the domain master apparatus 701 to carry out one or more of the above-described techniques to coordinate with the DM or DMs of the one or more neighboring domains to minimize mutual interference between these neighboring networks and to maximize throughput of their respective network nodes. In one embodiment, the communication coordination device 705 includes the above-described scrambler as shown in FIG.

4 to determine the ordering among the participating DMs regarding allotment of time slots of one or more MAC cycles.

Exemplary Computing Device

Figure 8:
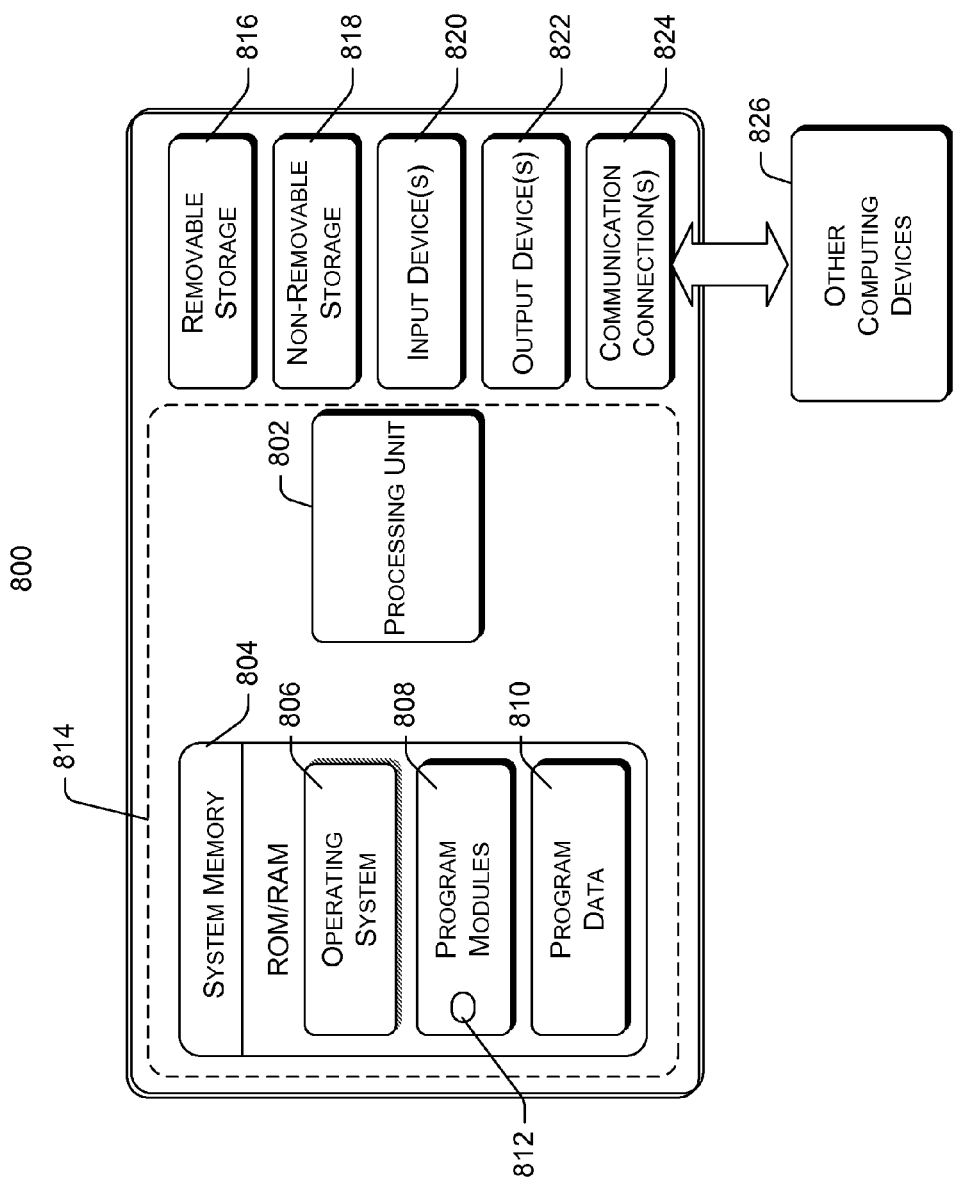
FIG. 8 is a block diagram illustrating an exemplary computing apparatus capable of implementing the coordination scheme in accordance with the present disclosure.

FIG. 8 illustrates an exemplary computing apparatus 800 capable of implementing the coordination scheme in accordance with the present disclosure.

In one embodiment, the computing apparatus 800 is a networking apparatus such as a network router or switch. In another embodiment, the computing apparatus 800 is a computer server. However, it will be readily appreciated that the techniques disclosed herein may be implemented in other computing equipment, systems, and environments. The computing apparatus 800 shown in FIG. 8 is only one example of a computing apparatus and is not intended to suggest any limitation as to the scope of use or functionality of the computer and network architectures. When implemented in a network environment, such as the domain 700 of FIG. 7, the computing apparatus 800 may function as the domain master apparatus 701.

In at least one configuration, computing apparatus 800 typically includes at least one processing unit 802 and system memory 804. Depending on the exact configuration and type of computing apparatus, system memory 804 may be volatile (such as RAM), non-volatile (such as ROM, flash memory, etc.) or some combination thereof. System memory 804 may include an operating system 806, one or more program modules 808, and program data 810. The computing apparatus 800 is of a very basic configuration demarcated by a dashed line 814.

In one embodiment, the program module 808 includes a communication coordination module 812. The communication coordination module 812 is configured to cause the computing apparatus 800, when the computing apparatus 800 functions as a DM or a domain, to carry out one or more of the above-described techniques to coordinate with the DM or DMs of one or more neighboring domains to minimize mutual interference between the neighboring networks and to maximize throughput of their respective network nodes.

Computing apparatus 800 may have additional features or functionality. For example, computing apparatus 800 may also include additional data storage devices (removable and/or non-removable) such as, for example, magnetic disks, optical disks, or tape. Such additional storage is illustrated in FIG. 8 by removable storage 816 and non-removable storage 818. Computer storage media may include volatile and non-volatile, removable and non-removable media implemented in any method or technology for storage of information, such as computer readable instructions, data structures, program modules, or other data. System memory 804, removable storage 816 and non-removable storage 818 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing apparatus 800. Any such computer storage media may be part of the computing apparatus 800. Computing apparatus 800 may also have input device(s) 820 such as keyboard, mouse, pen, voice input device, touch input device, etc. Output device(s) 822 such as a display, speakers, printer, etc. may also be included.

Computing apparatus 800 may also contain communication connections 824 that allow the device to communicate with other computing devices 826 over one or more networks including power line, coaxial cable, phone line or Ethernet, or a combination thereof. These networks may also include wireless networks. In one embodiment, the computing apparatus 800 is the domain master of a network domain which includes one or more computing devices 826 as the network nodes of such domain.

It is appreciated that the illustrated computing apparatus 800 is only one example of a suitable apparatus and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

Exemplary Methods

FIG. 9 is a flow diagram illustrating an exemplary method 900 implementing the coordination scheme in accordance with the present disclosure.

At 902, a first domain master of a first network domain determines a first number of network nodes of the first network domain that interfere with data transmission on the physical medium by at least one network node of at least one other network domain, or a second number of network nodes of the at least one other network domain that interfere with data transmission on the physical medium by at least one network node of the first network domain. At 904, the first domain master causes one or more network nodes of the first network domain to transmit data during one of a plurality of non-overlapping time slots of a Media Access Control (MAC) cycle, each of the plurality of non-overlapping time slots allocated to a respective one of the first and the at least one other network domains.

In one embodiment, the first domain master may further perform acts comprising: determining the second number of network nodes of the at least one other network domain that interfere with data transmission on the physical medium by at least one network node of the first network domain; communicating information relating to the second number of network nodes to a respective domain master of each of the at least one other network domain; receiving information relating to the first number of network nodes from the respective domain master of each of the at least one other network domain; and dividing the MAC cycle into the plurality of non-overlapping time slots such that each of the plurality of non-overlapping time slots is allocated for transmission by one or more nodes of a respective one of the first and the at least one other network domains.

In one embodiment, the first domain master may divide the MAC cycle into the plurality of non-overlapping time slots in equal proportion among the first and the at least one other network domains. Alternatively, the first domain master may divide the MAC cycle into the plurality of non-overlapping time slots according to a setting by a service provider.

FIG. 10 is a flow diagram illustrating another exemplary method 1000 implementing the coordination scheme in accordance with the present disclosure.

Method 1000 first performs 902 and 904 of method 900. Additionally, at 1006, the method 1000 scrambles a reversed MAC address of the first domain master and a respective reversed MAC address of a respective domain master of each of the at least one other network domain to determine an order in which the time slots are allocated to the domain masters of the first and the at least one other network domains. At 1008, the method 1000 allocates the time slots to the domain masters of the first and the at least one other network domains according to the determined order.

FIG. 11 is a flow diagram illustrating another exemplary method 1100 implementing the coordination scheme in accordance with the present disclosure.

Method 1100 first performs 902 and 904 of method 900. Additionally, at 1106, the method 1100 generates a pseudo-random order based at least in part on a respective device identifier or a respective MAC address of each of the domain masters of the first and the at least one other network domains. At 1108, the method allocates the time slots to the domain masters of the first and the at least one other network domains according to the pseudo-random order.

FIG. 12 is a flow diagram illustrating another exemplary method 1200 implementing the coordination scheme in accordance with the present disclosure.

Method 1200 first performs 902 and 904 of method 900. Additionally, at 1206, the method 1200 places in sleep mode one or more nodes in the first network domain that may suffer interference from transmission by at least one node in one of the at least one other network domain during a portion of the MAC cycle allocated to the one of the at least one other network domain.

Figure 13:
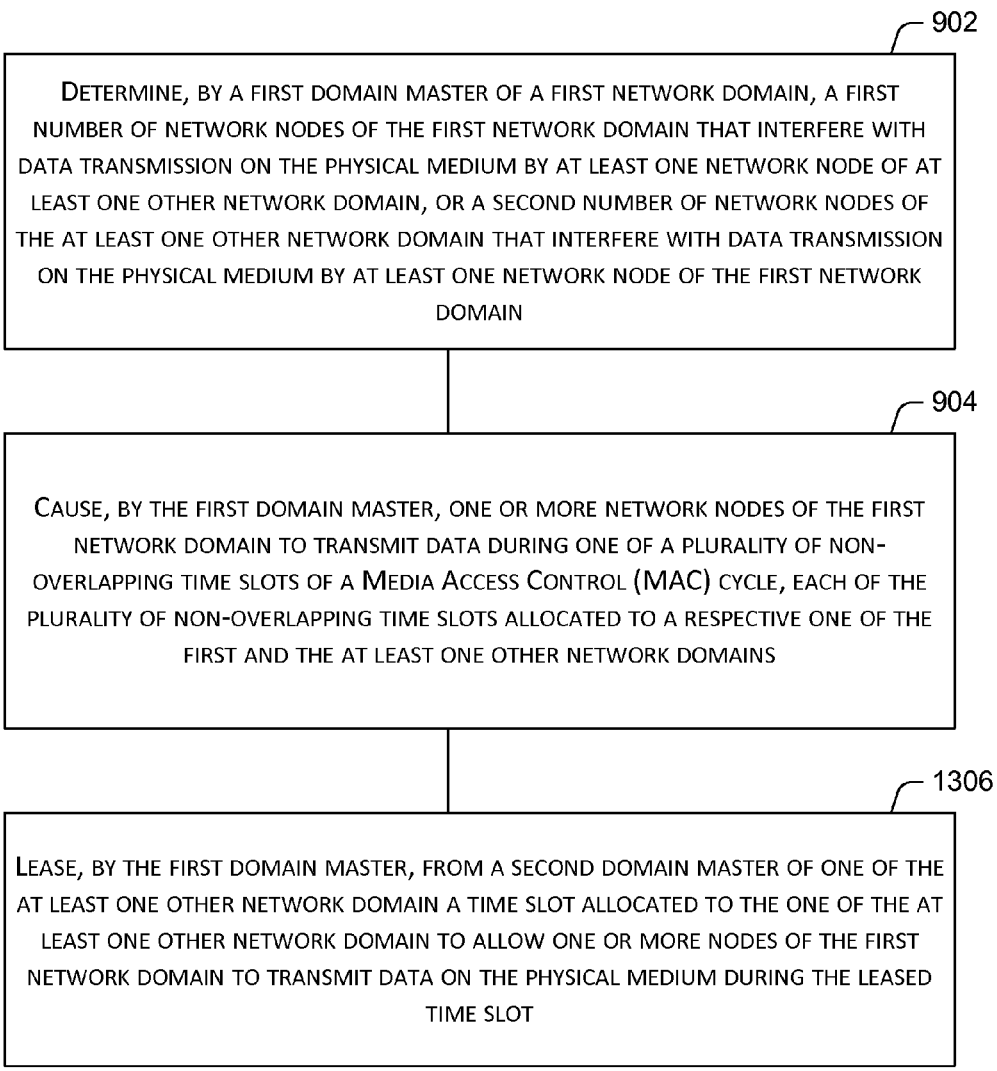
FIG. 13 is a flow diagram illustrating another exemplary method implementing the coordination scheme in accordance with the present disclosure.

FIG. 13 is a flow diagram illustrating another exemplary method 1300 implementing the coordination scheme in accordance with the present disclosure.

Method 1300 first performs 902 and 904 of method 900. Additionally, at 1306, the first domain master leases from a second domain master of one of the at least one other network domain a time slot allocated to the one of the at least one other network domain to allow one or more nodes of the first network domain to transmit data on the physical medium during the leased time slot.

In one embodiment, the first domain master and the second domain master may negotiate the leasing of the time slot by the first domain master offering a number of credits to the second domain master and the second domain master determining whether to accept the offered credits from the first domain master, a goal of each of the first and second domain masters being to maximize a respective number of credits collected. The number of credits offered by the first domain master to the second domain master may depend proportionately on a priority based on the first network domain's traffic or urgency for additional access to the physical medium. The priority may be user-configured, and a respective initial number of credits of each of the first domain master and the second domain master may be configured by a system operator. Alternatively or additionally, the exchange of credits happens through the system operator which acts as an intermediary for the transactions between two DMs exchanging credits and also keeps track of the credit balance of the negotiating DMs.

Additionally or alternatively, the method may implement one or more of following leasing policies: (1) the first domain master leasing a time slot allocated to the first network domain but not used by the first network domain to a second domain master of a second network domain of the at least one other network domain when requested by the second domain master; (2) the first domain master negotiating with the second domain master to lease the unused time slot when the first domain master accepts a number of credits offered by the second domain master which may alternatively or additionally be done through the system operator acting as an intermediary that keeps track of the credits and facilitates the exchange of the credits; (3) the first domain master leasing to the second domain master part or all of the unused time slot to be used in a Carrier Sensing Multiple Access (CSMA) transmit opportunity when the leasing allows the first and second network domains to use the leased time slot by following a back-off procedure which may alternatively or additionally based on the second domain master reciprocating; and (4) the first domain master leasing to the second domain master part or all of the unused time slot to be used in an Orthogonal Carrier Sensing Multiple Access (OCSMA) transmit opportunity where transmitting nodes in either network domain are allowed to transmit only using preambles that are designed to be orthogonal to the preambles from interfering nodes in coordinating network domain, when the leasing allows the first and second network domains to use the leased time slot by following a back-off procedure.

Alternatively or additionally, the leasing may be based on the second DM reciprocating the offer from the first DM. The orthogonal preambles allow nodes from a network domain to tune their detectors to the preamble expected from transmission within their network domain and ignore transmissions from neighboring network domains. This scheme works better when the interference between the nodes from neighboring network domains is low, allowing reuse of the same transmit opportunity in both network domains.

FIG. 14 is a flow diagram illustrating another exemplary method 1400 implementing the coordination scheme in accordance with the present disclosure.

Method 1400 first performs 902 and 904 of method 900. Additionally, at 1406, the first domain master generates a coordination table indicating one or more respective network nodes in each of the first and the at least one other network domains that interfere with at least one network node of another network domain and the respective network domain having the interfered at least one network node. At 1408, the first domain master provides the coordination table to a respective domain master of each of the at least one other network domain.

Additionally, the method may further comprise: communicating, by the first domain master, to the respective domain master of each of the at least one other network domain a proposed value of a synchronous counter when an allocation of the non-overlapping time slots needs to be updated; receiving, by the first domain master, an acknowledgment from a second domain master of a second network domain of the at least one other network domain when the second domain master accepts the proposed value; and providing, by the first domain master, to the respective domain master of each of the at least one other network domain a binding proposal after the first domain master has received acknowledgment from the respective domain master of each of the at least one other network domain.

FIG. 15 is a flow diagram illustrating another exemplary method 1500 implementing the coordination scheme in accordance with the present disclosure.

Method 1500 first performs 902 and 904 of method 900. Additionally, at 1506, the first domain master provides a coordination table to a system operator, the coordination table indicating one or more respective network nodes in each of the first and the at least one other network domains that interfere with at least one network node of another network domain and the respective network domain having the interfered at least one network node. At 1508, the first domain master receives from the system operator a final coordination table that incorporates information in the coordination table provided by the first domain master and information in a respective coordination table provided by a respective domain master of each of the at least one other network domain.

FIG. 16 is a flow diagram illustrating another exemplary method 1600 implementing the coordination scheme in accordance with the present disclosure.

Method 1600 first performs 902 and 904 of method 900. Additionally, at 1606, the method 1600 allocates a quantity of N non-overlapping time slots of equal duration to m network domains, m being a quantity of a number of mutually-interfering network domains, each of the m network domains allocated with one of the time slots with a quantity of (N−m) time slots unallocated when N>m. At 1608, the method repeatedly allocates the unallocated time slots to the m network domains K times with L time slots remaining unallocated when K>0, where K=(N−m)/m. At 1610, the method 1600 equally divides each of the L unallocated time slots and allocating the equally divided time slots to the m network domains.

Conclusion

The above-described scheme, and the various techniques and embodiments, pertains to coordination among neighboring networks for communications over shared physical medium for wireline communication channels such as power line, coaxial cable, phone line and Ethernet. The proposed scheme provides a number of advantages as noted below.

Firstly, the restrictions on medium access are selectively applied to only those network nodes which either interfere with network nodes in neighboring domains or suffer interference from network nodes in neighboring domains, or both. This ensures that the network nodes that are not subject to interference do not suffer any degradation in throughput or performance and have full access to medium resources.

Secondly, the scheme can be easily scaled up with the number of neighboring domains, in such a way that the medium access restrictions on transmission are proportional to the number of neighboring domains, at a per-network node granularity.

Thirdly, the scheme allows flexibility in trading medium resources between domains, so that a domain that is not using its resources can allow its neighboring domains to use those resources in a predictable manner and for a pre-determined time without causing any interference. The concept of ownership of medium access resources that has been introduced here is fundamental for this approach to work and provides a framework for this kind of trading of medium resources. This same approach can be used to pool together the resources belonging to different domains and use a CSMA scheme or OCSMA scheme.

Moreover, the scheme provides tools to system operators that allow prioritizing access to the medium resources according to the service level configured for each of the domains. Those tools can also be used to identify the network nodes that are responsible for interference and suggest corrective action to the user, so that those network nodes can be relocated whenever possible to minimize interference to and from neighboring domains.

Furthermore, the scheme provides a framework for seamless operation of neighboring domains and also provides additional tools to maximize the overall utilization of the medium resources, ultimately resulting in improved throughput, improved support for quality of service (QoS), reduced retransmissions due to lost packet, and also lower overall power consumption.

Lastly but not least, the scheme is quite general and allows a single DM to coordinate with two independent sets of DMs.

Although the techniques have been described in language specific to structural features and/or methodological acts, it is to be understood that the appended claims are not necessarily limited to the specific features or acts described. Rather, the specific features and acts are disclosed as exemplary forms of implementing such techniques. Further, the described techniques are not necessarily limited to wireline applications but may be applied to other suitable applications, including wireless networks for example.

What is claimed is:

1. A method of coordination of physical medium access among neighboring domains of network nodes, the method comprising:
   determining, by a first domain master of a first network domain, a first number of network nodes of the first network domain that interfere with data transmission on the physical medium by at least one network node of at least one other network domain, or a second number of network nodes of the at least one other network domain that interfere with data transmission on the physical medium by at least one network node of the first network domain; and
   scheduling, by the first domain master, each of one or more network nodes of the first network domain that interfere with or experience interference in data transmission on the physical medium by at least one network node of the at least one other network domain to transmit data during one or more of a plurality of non-overlapping time slots of a Media Access Control (MAC) cycle while allowing one or more other network nodes of the first network domain that do not interfere with or experience interference in data transmission on the physical medium by at least one network node of the at least one other network domain to transmit data anytime during the MAC cycle, each of the plurality of non-overlapping time slots allocated to a respective one of the first and the at least one other network domains.

2. A method as recited in claim 1, wherein the first domain master further performs acts comprising:
   determining the second number of network nodes of the at least one other network domain that interfere with data transmission on the physical medium by at least one network node of the first network domain;
   communicating information relating to the second number of network nodes to a respective domain master of each of the at least one other network domain;
   receiving information relating to the first number of network nodes from the respective domain master of each of the at least one other network domain; and
   dividing the MAC cycle into the plurality of non-overlapping time slots such that each of the plurality of non-overlapping time slots is allocated for transmission by one or more nodes of a respective one of the first and the at least one other network domains.

3. A method as recited in claim 2, wherein the first domain master divides the MAC cycle into the plurality of non-overlapping time slots in equal proportion among the first and the at least one other network domains.

4. A method as recited in claim 2, wherein the first domain master divides the MAC cycle into the plurality of non-overlapping time slots according to a setting by a service provider.

5. A method as recited in claim 1, further comprising:
   scrambling a reversed MAC address of the first domain master and a respective reversed MAC address of a respective domain master of each of the at least one other network domain to determine an order in which the time slots are allocated to the domain masters of the first and the at least one other network domains; and
   allocating the time slots to the domain masters of the first and the at least one other network domains according to the determined order.

6. A method as recited in claim 1, further comprising:
generating a pseudo-random order based at least in part on a respective device identifier or a respective MAC address of each of the domain masters of the first and the at least one other network domains; and
allocating the time slots to the domain masters of the first and the at least one other network domains according to the pseudo-random order.

7. A method as recited in claim 1, further comprising:
placing in sleep mode one or more nodes in the first network domain that may suffer interference from transmission by at least one node in one of the at least one other network domain during a portion of the MAC cycle allocated to the one of the at least one other network domain.

8. A method of coordination of physical medium access among neighboring domains of network nodes, the method comprising:
determining, by a first domain master of a first network domain, a first number of network nodes of the first network domain that interfere with data transmission on the physical medium by at least one network node of at least one other network domain, or a second number of network nodes of the at least one other network domain that interfere with data transmission on the physical medium by at least one network node of the first network domain;
scheduling, by the first domain master, one or more network nodes of the first network domain to transmit data during one or more of a plurality of non-overlapping time slots of a Media Access Control (MAC) cycle, each of the plurality of non-overlapping time slots allocated to a respective one of the first and the at least one other network domains; and
leasing, by the first domain master, from a second domain master of one of the at least one other network domain a time slot allocated to the one of the at least one other network domain to allow one or more nodes of the first network domain to transmit data on the physical medium during the leased time slot.

9. A method as recited in claim 8, wherein the first domain master and the second domain master negotiate the leasing of the time slot by the first domain master offering a number of credits to the second domain master and the second domain master determining whether to accept the offered credits from the first domain master, a goal of each of the first and second domain masters being to maximize a respective number of credits collected.

10. A method as recited in claim 9, wherein the number of credits offered by the first domain master to the second domain master depends proportionately on a priority based on the first network domain's traffic or urgency for additional access to the physical medium.

11. A method as recited in claim 10, wherein the priority is user-configured, and wherein a respective initial number of credits of each of the first domain master and the second domain master is configured by a system operator.

12. A method as recited in claim 9, wherein an exchange of credits between the first and second domain masters is facilitated by a system operator, the system operator acting as an intermediary for transactions between the first and second domain masters exchanging credits, the system operator further keeping track of a credit balance of each domain master.

13. A method as recited in claim 8, further comprising:
implementing one or more of following leasing policies:
(1) the first domain master leasing a time slot allocated to the first network domain but not used by the first network domain to a second domain master of a second network domain of the at least one other network domain when requested by the second domain master;
(2) the first domain master negotiating with the second domain master to lease the unused time slot when the first domain master accepts a number of credits offered by the second domain master;
(3) the first domain master leasing to the second domain master part or all of the unused time slot to be used in a Carrier Sensing Multiple Access (CSMA) transmit opportunity when the leasing allows the first and second network domains to use the leased time slot by following a back-off procedure; and
(4) the first domain master leasing to the second domain master part or all of the unused time slot to be used in an Orthogonal Carrier Sensing Multiple Access (OCSMA) transmit opportunity where transmitting nodes in either network domain are allowed to transmit only using preambles that are designed to be orthogonal to the preambles from interfering nodes in coordinating network domains, when the leasing allows the first and second network domains to use the leased time slot by following the back-off procedure.

14. A method as recited in claim 13, wherein the negotiating is done through a system operator which acts as an intermediary that keeps track of credits and facilitates an exchange of the credits.

15. A method as recited in claim 13, wherein the leasing to the second domain master part or all of the unused time slot to be used in an OCSMA transmit opportunity is based on the second domain master reciprocating an offer from the first domain master, wherein the orthogonal preambles allow nodes from a given network domain to tune their detectors to a preamble expected from transmission within the given network domain and ignore transmissions from neighboring network domains.

16. A method as recited in claim 1, further comprising:
generating, by the first domain master, a coordination table indicating one or more respective network nodes in each of the first and the at least one other network domains that interfere with at least one network node of another network domain and the respective network domain having the interfered at least one network node; and
providing, by the first domain master, the coordination table to a respective domain master of each of the at least one other network domain.

17. A method as recited in claim 16, further comprising:
communicating, by the first domain master, to the respective domain master of each of the at least one other network domain a proposed value of a synchronous counter when an allocation of the non-overlapping time slots needs to be updated;
receiving, by the first domain master, an acknowledgment from a second domain master of a second network domain of the at least one other network domain when the second domain master accepts the proposed value; and
providing, by the first domain master, to the respective domain master of each of the at least one other network domain a binding proposal after the first domain master has received acknowledgment from the respective domain master of each of the at least one other network domain.

18. A method as recited in claim 1, further comprising:
providing, by the first domain master, a coordination table to a system operator, the coordination table indicating one or more respective network nodes in each of the first and the at least one other network domains that interfere with at least one network node of another network domain and the respective network domain having the interfered at least one network node; and receiving, by the first domain master, from the system operator a final coordination table that incorporates information in the coordination table provided by the first domain master and information in a respective coordination table provided by a respective domain master of each of the at least one other network domain.

19. A method as recited in claim 1, further comprising:

allocating a quantity of N non-overlapping time slots of equal duration to m network domains, m being a quantity of a number of mutually-interfering network domains, each of the m network domains allocated with one of the time slots with a quantity of (N-m) time slots unallocated when N >m;

repeatedly allocating the unallocated time slots to the m network domains K times with L time slots remaining unallocated when K >0, where K =(N-m)/m; and equally dividing each of the L unallocated time slots and allocating the equally divided time slots to the m network domains.

20. A device that, when implemented in a first domain master apparatus of a first network domain including a plurality of network nodes, causes the first domain master apparatus to perform acts comprising:

determining a first number of network nodes of the first network domain that interfere with data transmission on a physical medium by at least one network node of at least one other network domain, or a second number of network nodes of the at least one other network domain that interfere with data transmission on the physical medium by at least one network node of the first network domain; and scheduling each of one or more network nodes of the first network domain that interfere with or experience interference in data transmission on the physical medium by at least one network node of the at least one other network domain to transmit data during one or more of a plurality of non-overlapping time slots of a Media Access Control (MAC) cycle while allowing one or more other network nodes of the first network domain that do not interfere with or experience interference in data transmission on the physical medium by at least one network node of the at least one other network domain to transmit data anytime during the MAC cycle, each of the plurality of non-overlapping time slots allocated to a respective one of the first and the at least one other network domains.

21. A device as recited in claim 20, wherein the device further causes the first domain master apparatus to perform acts comprising:

determining the second number of network nodes of the at least one other network domain that interfere with data transmission on the physical medium by at least one network node of the first network domain;

communicating information relating to the second number of network nodes to a respective domain master apparatus of each of the at least one other network domain;

receiving information relating to the first number of network nodes from the respective domain master apparatus of each of the one other network domain; and dividing the MAC cycle into the plurality of non-overlapping time slots such that each of the plurality of non-overlapping time slots is allocated for transmission by one or more nodes of a respective one of the first and the at least one other network domains.

22. A device as recited in claim 21, wherein the device causes the first domain master apparatus to divide the MAC cycle into the plurality of non-overlapping time slots in equal proportion among the first and the at least one other network domains.

23. A method as recited in claim 21, wherein the device causes the first domain master apparatus to divide the MAC cycle into the plurality of non-overlapping time slots according to a setting by a user.

24. A device as recited in claim 20, wherein the device further causes the first domain master apparatus to perform acts comprising:

scrambling a reversed MAC address of the first domain master apparatus and a respective reversed MAC address of a respective domain master apparatus of each of the at least one other network domain to determine an order in which the time slots are allocated to the domain master apparatuses of the first and the at least one other network domains; and allocating the time slots to the domain master apparatuses of the first and the at least one other network domains according to the determined order.

25. A device as recited in claim 20, wherein the device further causes the first domain master apparatus to perform acts comprising:

generating a pseudo-random order based at least in part on a respective device identifier or a respective MAC address of each of the domain master apparatuses of the first and the at least one other network domains; and allocating the time slots to the domain master apparatuses of the first and the at least one other network domains according to the pseudo-random order.

26. A device as recited in claim 20, wherein the device further causes the first domain master apparatus to perform acts comprising:

placing in sleep mode one or more nodes in the first network domain that may suffer interference from transmission by at least one node in one of the at least one other network domain during a portion of the MAC cycle allocated to the one of the at least one other network domain.

27. A device as recited in claim 20, wherein the device comprises an integrated circuit, and wherein the physical medium comprises a power line, a coaxial cable, a phone line, an Ethernet, or a combination thereof.

28. A device as recited in claim 20, wherein the device causes the first domain master apparatus to communicate with other domain master apparatuses prior to coordination via Registration Contention Based Time Slot (RCBTS).

29. A method as recited in claim 1, further comprising:

leasing, by the first domain master, from a second domain master of one of the at least one other network domain a time slot allocated to the one of the at least one other network domain to allow one or more nodes of the first network domain to transmit data on the physical medium during the leased time slot, the one or more nodes of the first network domain being one or more nodes that interfere with or experience interference in data transmission on the physical medium by at least one network node of the at least one other network domain.

30. A method as recited in claim 29, wherein the first domain master and the second domain master negotiate the leasing of the time slot by the first domain master offering a number of credits to the second domain master and the second domain master determining whether to accept the offered credits from the first domain master, a goal of each of the first and second domain masters being to maximize a respective number of credits collected.

31. A method as recited in claim 30, wherein the number of credits offered by the first domain master to the second domain master depends proportionately on a priority based on the first network domain's traffic or urgency for additional access to the physical medium.

32. A method as recited in claim 31, wherein the priority is user-configured, and wherein a respective initial number of credits of each of the first domain master and the second domain master is configured by a system operator.

33. A method as recited in claim 30, wherein an exchange of credits between the first and second domain masters is facilitated by a system operator, the system operator acting as an intermediary for transactions between the first and second domain masters exchanging credits, the system operator further keeping track of a credit balance of each domain master.

34. A method as recited in claim 29, further comprising: implementing one or more of following leasing policies:
   (1) the first domain master leasing a time slot allocated to the first network domain but not used by the first network domain to a second domain master of a second network domain of the at least one other network domain when requested by the second domain master;
   (2) the first domain master negotiating with the second domain master to lease the unused time slot when the first domain master accepts a number of credits offered by the second domain master;
   (3) the first domain master leasing to the second domain master part or all of the unused time slot to be used in a Carrier Sensing Multiple Access (CSMA) transmit opportunity when the leasing allows the first and second network domains to use the leased time slot by following a back-off procedure; and
   (4) the first domain master leasing to the second domain master part or all of the unused time slot to be used in an Orthogonal Carrier Sensing Multiple Access (OCSMA) transmit opportunity where transmitting nodes in either network domain are allowed to transmit only using preambles that are designed to be orthogonal to the preambles from interfering nodes in coordinating network domains, when the leasing allows the first and second network domains to use the leased time slot by following the back-off procedure.

35. A method as recited in claim 34, wherein the negotiating is done through a system operator which acts as an intermediary that keeps track of credits and facilitates an exchange of the credits.

36. A method as recited in claim 34, wherein the leasing to the second domain master part or all of the unused time slot to be used in an OCSMA transmit opportunity is based on the second domain master reciprocating an offer from the first domain master, wherein the orthogonal preambles allow nodes from a given network domain to tune their detectors to a preamble expected from transmission within the given network domain and ignore transmissions from neighboring network domains.

* * * * *